(12) United States Patent
Goto et al.

(10) Patent No.: US 8,742,045 B2
(45) Date of Patent: Jun. 3, 2014

(54) POLYMERIZATION INITIATOR FOR LIVING RADICAL POLYMERIZATION

(75) Inventors: Atsushi Goto, Uji (JP); Jeong Sik Kim, Uji (JP); Yoshinobu Tsujii, Uji (JP); Takeshi Fukuda, Uji (JP)

(73) Assignee: Kyoto University, Kyoto-shi, Kyoto (JP)

( * ) Notice: Subject to any disclaimer, the term of this patent is extended or adjusted under 35 U.S.C. 154(b) by 225 days.

(21) Appl. No.: 13/375,853

(22) PCT Filed: Jun. 3, 2010

(86) PCT No.: PCT/JP2010/003722
§ 371 (c)(1),
(2), (4) Date: Feb. 13, 2012

(87) PCT Pub. No.: WO2010/140372
PCT Pub. Date: Dec. 9, 2010

(65) Prior Publication Data
US 2012/0136131 A1     May 31, 2012

(30) Foreign Application Priority Data
Jun. 3, 2009  (JP) ................................. 2009-134541

(51) Int. Cl.
*C08F 4/609*     (2006.01)

(52) U.S. Cl.
USPC ........................................ 526/206; 526/214

(58) Field of Classification Search
USPC ................................. 526/206, 214
See application file for complete search history.

(56) References Cited

U.S. PATENT DOCUMENTS

| 3,190,878 | A | * | 6/1965 | Ikeda ............................ 526/120 |
| 5,609,632 | A | * | 3/1997 | Elgas ............................ 128/898 |
| 5,840,735 | A | * | 11/1998 | Labrie et al. .................. 514/320 |

| 2007/0049715 | A1 | 3/2007 | Goto et al. ..................... 526/346 |
| 2010/0298499 | A1 | 11/2010 | Goto et al. ..................... 525/192 |
| 2011/0124832 | A1 | 5/2011 | Goto et al. ..................... 526/204 |

FOREIGN PATENT DOCUMENTS

| JP | 2002-053630 | 2/2002 |
| JP | 2007-092014 | 4/2007 |
| WO | WO 2008/139980 A1 | 11/2008 |
| WO | WO 2009/136510 A1 | 11/2009 |

OTHER PUBLICATIONS

Angot et al., "Atom Transfer Radical Polymerization of Styrene Using a Novel Octafunctional Initiator: Synthesis of Well-Defined Polystyrene Stars," *Macromolecules 31*: 7218-7225, 1998.

Goto et al., "Reversible Chain Transfer Catalyzed Polymerization (RTCP) with Alcohol Catalysts," ACS Symposium Series, 1023 (Controlled/Living Radical Polymerization: Progress in ATRP), 159-168 Coden: ACSMC8; ISSN: 0097-6156, 2009, XP8158284.

* cited by examiner

*Primary Examiner* — Kuo-Liang Peng
(74) *Attorney, Agent, or Firm* — Seed IP Law Group PLLC

(57) ABSTRACT

Provided is a method of living radical polymerization which does not necessitate complicated and intricate synthesis of a dormant species and which is highly efficient. A halogenated derivative compound is used as a dormant species for initiating living radical polymerization. The derivative compound is obtained by halogenating an alcohol compound having a non-conjugated structure or an amine compound having a non-conjugated structure with a halogenating agent capable of halogenating an alcohol or amine. A radical produced by elimination of halogen from the halogenated derivative compound is allowed to react with the unsaturated bond of the monomer. Thus, the monomer, which has a radical-reactive unsaturated bond, is polymerized by living radical polymerization. Preferably, the halogenating agent is a compound (NIS or the like) which also has a function as a catalyst.

10 Claims, 2 Drawing Sheets

POLYMERIZATION INITIATOR FOR LIVING RADICAL POLYMERIZATION

TECHNICAL FIELD

The present invention is directed to a polymerization initiator used for living radical polymerization and a polymerization method using the same. More specifically, the present invention relates to a method of using a compound obtained by allowing a compound having a hydroxyl group or an amino group to react with a halogenating agent as a starting dormant species for living radical polymerization.

Specifically, the method of the present invention comprises:

a step of halogenating an alcohol compound, amine compound or the like having a non-conjugated structure with a halogenating agent to produce a halogenated derivative compound, and a step of conducting living radical polymerization of a monomer having a radical-reactive unsaturated bond using the halogenated derivative compound as a dormant species for the living radical polymerization, wherein a radical produced by elimination of a halogen from the halogenated derivative compound is allowed to react with the unsaturated bond of the monomer.

BACKGROUND ART

A radical polymerization method has been a well-known method for polymerizing vinyl monomers to obtain a vinyl polymer. Generally, a radical polymerization method has the disadvantage of the difficulty in controlling the molecular weight of the obtained vinyl polymer. Further, there is the disadvantage that the obtained vinyl polymer is a mixture of compounds having various molecular weights, and thus it is difficult to obtain a vinyl polymer having narrow molecular weight distribution. Specifically, even if the reaction is controlled, the ratio of weight-average molecular weight ($M_w$) and number-average molecular weight ($M_n$), ($M_w/M_n$), can be only reduced to about 2 to 3.

As a method for eliminating the aforementioned disadvantages, since around 1990, a living radical polymerization method has been developed. Specifically, according to the living radical polymerization method, it is possible to control the molecular weight. It is also possible to obtain a polymer having narrow molecular weight distribution. Specifically, a polymer having $M_w/M_n$ of 2 or less can easily be obtained. Therefore, this method has come into the limelight as a method for producing a polymer used in advanced technology such as nanotechnology.

Living radical polymerization methods are disclosed in, for example, patent documents 1-4 and non-patent documents 1-6, which are described later.

In order to perform living radical polymerization efficiently, conventionally, halogenated hydrocarbons or the like has been used as a so-called dormant species. However, in the case of using a halogenated hydrocarbon or the like as a dormant species, it is necessary to synthesize or obtain the halogenated hydrocarbon or the like in advance. Therefore, a process without the need of synthesis or the like of a dormant species has been desired.

Moreover, it is known that the living radical polymerization method can be used for manufacturing a polymer product of a complicated structure such as the so-called star-type polymer (FIG. 3), comb-type polymer (FIG. 4), and surface graft polymer (FIG. 5). Specifically, for example, there is a method of using a compound having a plurality of starting groups arranged so as to correspond to the polymer chain arrangement of a desired product. In such a case, in particular, preparation of the compound having the plurality of the starting groups is required, and thus it is disadvantageous in that the process as a whole is complicated.

On the other hand, in the living radical polymerization, it is also disadvantageous in that an expensive catalyst is needed in a large amount.

However, when such a transition metal complex catalyst is used, it is necessary to use a large amount of the catalyst. This is disadvantageous as it is not easy to completely remove the large amount of the catalyst used, from the products after the reaction. Another disadvantage is environmental problems which may occur by the disposal of the catalyst. The transition metal for the living radical polymerization method includes many toxic metals. The disposal of a large amount of such toxic metals causes environmental problems. Furthermore, there are cases where toxicities of catalysts remaining in products cause environmental problems. Due to the toxicity, it is difficult to use the transition metal catalysts for the production of food packages, material for living body, and medical material. Additionally, there is a problem associated with a high electroconductivity of the transition metal remaining in polymer, rendering the polymer conductive and hence unsuitable for use in electronic material such as resist material. Furthermore, the transition metal-type catalysts do not dissolve in a reaction solution unless they form a complex. Therefore, it is necessary to use a ligand as an additive to form a complex. This causes problems, i.e., an increase of the cost of production and also an increase of the total weight of the catalyst used. Further, a ligand is usually expensive and requires a complicated synthesis method. Furthermore, the polymerization reaction requires a high temperature (for example, 110° C. or higher). (For example, in aforementioned Non-patent document 1, the polymerization reaction is performed at 110° C.).

As mentioned above, conventionally, in order to conduct living radical polymerization efficiently, generally, a catalyst and a dormant species are used in combination.

For example, Patent Document 1 (Japanese Laid-open Publication No. 2002-249505) discloses that a complex, in which Cu, Ru, Fe, Ni or the like is a central metal, is used as a catalyst.

Further, Patent Document 2 (Japanese Laid-open Publication No. 11-322822) discloses that a hydrido rhenium complex is used as a catalyst and hydrocarbon halide is used as a dormant species.

Non-Patent Document 1 (*Journal of The American Chemical Society* 119, 674-680 (1997)) discloses that a compound in which 4,4'-di-(5-nonyl)-2,2'-bipyridine is coordinated with copper bromide, is used as a catalyst. In the case of the copper complex catalyst disclosed in Non-Patent Document 1, the catalyst cost needed for polymerization of 1 kg of a polymer is about several thousand yen.

It is noted that a living radical polymerization methods, which do not require a catalyst, have also been known. For example, a nitroxyl-type method and dithioester-type method have been known. However, these methods have the following disadvantages. A special protecting group (i.e., a certain nitroxide or dithioester group) must be introduced to the polymer growing chain. The protecting group is very expensive. Further, the polymerization reaction requires a high temperature (for example, 110° C. or higher). Further, the produced polymer is likely to have undesirable properties. For example, the produced polymer is likely to be colored differently from the natural color of the polymer. Further, the produced polymer is likely to have an odor.

On the other hand, Non-Patent Document 2 (*Polymer Preprints* 2005, 46(2), 245-246) and Patent Document 3 (Japanese Laid-open Patent Publication No. 2007-92014) disclose that compounds having Ge, Sn, or the like as a central metal are used as catalysts, and that hydrocarbon halide is used as a dormant species. Moreover, Patent Document 4 (International Publication WO2008/139980) discloses that a compound, having nitrogen or phosphorus as the central metal, is used as a catalyst.

Moreover, Non-Patent Document 3 discloses that a phosphorus compound is used as a catalyst and an organic halide is used as a dormant species.

As mentioned above, conventionally, it was technical common knowledge of those skilled in the art that in order to efficiently conduct living radical polymerization, a combination of a catalyst and a dormant species is used.

As the dormant species, alkyl halides and the like have been considered preferable, and an alcohol compound has not been considered usable as the dormant species.

On the other hand, in the research of a low molecular weight compound not related to the reaction for synthesizing a polymer, reaction of a halogen with various compounds such as alcohols has been studied.

For example, Non-Patent Document 4 describes a method for oxidation cyclization of mono-t-butyl dimethyl silylated diol. Although Non-Patent Document 4 discloses a reaction for iodizing the hydroxyl group of mono-t-butyl dimethyl silylated diol with N-iodosuccinimide (NIS) in the middle of a reaction, it does not disclose use of the reaction for a method other than the method for oxidation cyclization of mono-t-butyl dimethyl silylated diol. That is, its use for polymer synthesis is not described at all.

Moreover, Non-Patent Document 5 discloses that a mixture of diacetoxy iodobenzene ($(AcO)_2IPh$) and $I_2$ is used for intramolecular hydrogen abstraction in order to synthesize a cyclic ether with a satisfactory yield. Although Non-Patent Document 5 discloses the reaction wherein an alcohol is iodized by a mixture of ($(AcO)_2IPh$) and $I_2$, it does not describes that the reaction is used for a purpose other than the synthesis of a cyclic ether. There is no description that the reaction is used for polymer synthesis.

Moreover, Non-Patent Document 6 describes a method for synthesizing a benzisothiazolone compound. Non-Patent Document 6 describes that a reaction, in which an amine is iodized by a mixture of ($(AcO)_2IPh$) and $I_2$, is generated at the time of synthesizing an intermediate of the compound (Scheme 1). However, it does not describe that the reaction is used for a method other than the method of synthesizing the benzisothiazolone compound. That is, there is no description that it is used for polymer synthesis.

Furthermore, Non-Patent Document 7 describes a method for synthesizing γ-lactone or δ-lactone from an aromatic carboxylic acid. Non-Patent Document 7 describes that a ring can be formed using a hydrogen abstraction reaction and halogenation reaction at the time of synthesizing a lactone ring (Path A at page 7089), and a mixture of $PhI(OCOCF_3)_2$ and $I_2$, a mixture of $Hg(OAc)_2$ and $I_2$, and a mixture of $Pb(OAc)_2$ and $I_2$ may be used as a reagent therefor (Table 3). However, it does not describe that the reaction is used for a method other than the method of synthesizing lactone. That is, there is no description that it is used for polymer synthesis.

PRIOR ART REFERENCES

Patent Documents

Patent Document 1 Japanese Laid-open Patent Publication No. 2002-249505

Patent Document 2 Japanese Laid-open Patent Publication No. 11-322822

Patent Document 3 Japanese Laid-open Patent Publication No. 2007-92014

Patent Document 4 International Publication WO2008/139980

Non-Patent Documents

Non-Patent Document 1 Journal of the American Chemical Society 119, 674-680 (1997)

Non-Patent Document 2 Polymer Preprints 2005, 46(2), 245-246, "Germanium- and Tin-Catalyzed Living Radical Polymerizations of Styrene", American Chemical Society, Division of Polymer Chemistry Non-Patent Document 3 Polymer Preprints 2007, 56(2), 2452, "A Novel Living Radical Polymerization using Germanium and Phosphorus Compound," The Society of Polymer Science, Japan, 56th Symposium on Macromolecules Non-Patent Document 4 Tetrahedron Lett. 30, 4791-4794 (1989)

Non-Patent Document 5 Tetrahedron Lett. 25, 1953-1956 (1984)

Non-Patent Document 6 Tetrahedron 55, 14885-14900 (1999)

Non-Patent Document 7 Tetrahedron Lett. 36, 7089-7092 (1995)

SUMMARY OF THE INVENTION

Problems to Be Solved by the Invention

The present invention aims to solve the aforementioned problems. It is an objective of the present invention to provide a living radical polymerization method using a new dormant species which does not require complicated steps in the manufacture.

Means for Solving Problem

The present inventors earnestly conducted research to solve the above-mentioned problems and, have accomplished the present invention as a result. Specifically, according to the present invention, the following polymerization method and the like are provided, and thereby the aforementioned problems are solved.

(1) A living radical polymerization method, comprising:

a step of halogenating an alcohol compound with a halogenating agent capable of halogenating hydrogen of a hydroxyl group of an alcohol to produce a halogenated derivative compound wherein the hydrogen in the hydroxyl group is substituted with a halogen, wherein the atom bound to the hydroxyl group of the alcohol compound has a non-conjugated structure, and a step of conducting living radical polymerization of a monomer having a radical-reactive unsaturated bond using the halogenated derivative compound as a dormant species for the living radical polymerization, wherein a radical produced by elimination of a halogen from the halogenated derivative compound is allowed to react with the unsaturated bond of the monomer.

(2) The method according to item 1, wherein the atom bound to the hydroxyl group in the alcohol compound is carbon or silicon.

(3) The method according to item 1, wherein the atom bound to the hydroxyl group in the alcohol compound is carbon having a $Sp^3$ hybrid orbital.

(4) The method according to any one of items 1 to 3, wherein the halogenating agent is an iodizing agent capable of iodizing an alcohol, or a brominating agent capable of brominating an alcohol.

(5) The method according to any one of items 1-4, wherein the halogenating agent is an iodizing agent capable of iodizing alcohol.

(6) The method according to any one of items 1 to 5, wherein the halogenating agent has a structure of the following formula 4,

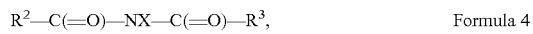

$$R^2\text{—}C(\!=\!O)\text{—}NX\text{—}C(\!=\!O)\text{—}R^3, \quad \text{Formula 4}$$

wherein X is a halogen, $R^2$ and $R^3$ are each independently an arbitrary substituent, $R^2$ and $R^3$ may be linked with each other to form a ring structure, and the halogenating agent acts also as a catalyst for living radical polymerization.

(7) The method according to item 6, wherein in the halogenating agent, $R^2$ and $R^3$ are linked with each other to be an alkylene or a substituted alkylene such that the structure of the formula 4 is a ring structure, the alkylene has 1 to 10 carbon atoms, the alkylene in the substituted alkylene has 1 to 10 carbon atoms, and the substituent in the substituted alkylene is selected from a halogen and a hydroxyl group.

(8) The method according to item 7, wherein the structure of the formula 4 is a 5-membered ring structure or a 6-membered ring structure, and X is iodine.

(9) The method according to any one of items 1 to 8, wherein the halogenating agent is N-iodosuccinimide.

(10) The method according to item 1, wherein the atom to which the hydroxyl group of the alcohol compound is bound is silicon.

(11) The method according to item 1, wherein the alcohol compound is solid.

(12) The method according to item 1, wherein the alcohol compound is a silicon substrate.

(13) The method according to any one of items 1 to 5, wherein the halogenating agent is a mixture of diacetoxy iodobenzene (($AcO)_2IPh$) and $I_2$.

(14) A polymer having a residue of a polyol compound bound to a terminal of a polymer chain obtained by radical polymerization of a monomer having a reactive unsaturated bond, wherein an oxygen atom derived from the hydroxyl group of the polyol compound is directly bound to any one of two carbon atoms which had composed a reactive unsaturated bond in the monomer residue of the terminal of the polymer chain.

(15) A substrate, to which terminals of polymer chains are bound, wherein the polymer chains are obtained by radical polymerization of a monomer having a reactive unsaturated bond, wherein an oxygen atom of the substrate surface is directly bound to any one of two carbon atoms in the monomer residue of the terminal of the polymer chain wherein the two carbon atoms had composed a reactive unsaturated bond.

(16) A polymer, wherein a residue of a silanol compound is bound to a terminal of a polymer chain obtained by radical polymerization of a monomer having a reactive unsaturated bond, wherein an oxygen atom derived from the hydroxyl group of the silanol compound is directly bound to any one of two carbon atoms in the monomer residue of the terminal of the polymer chain wherein the two carbon atoms had composed a reactive unsaturated bond.

(17) A living radical polymerization method, comprising:

a step of halogenating hydrogen which is bound to the nitrogen of an amino group of a primary or secondary amine compound with a halogenating agent capable of halogenating hydrogen which is bound to the nitrogen of an amino group, to produce a halogenated derivative compound wherein the hydrogen of the amine compound is substituted with a halogen, wherein the atom which is bound to the amino group of the amine compound has a non-conjugated structure, and a step of conducting living radical polymerization of a monomer having a radical-reactive unsaturated bond using the halogenated derivative compound as a dormant species for the living radical polymerization, wherein a radical produced by elimination of a halogen from the halogenated derivative compound is allowed to react with the unsaturated bond of the monomer.

Effect of the Invention

The present invention provides an initiator system for living radical polymerization without the need of a starting dormant species of a complicated structure and a polymerization method using the same.

According to the initiator system of the present invention, it is made possible to use various alcohol compounds or amine compounds such that the troublesome design of a starting group, which has conventionally been indispensable, becomes unnecessary. Further, it is made possible to use various organic or inorganic compounds having a hydroxyl group or an amino group for the initiator system. The compound usable for the initiator system may be an organic compound or an inorganic compound. Moreover, it may be a low molecular weight compound or a high molecular weight compound. Furthermore, the compound usable for the initiator system may be liquid or solid. In the case of using a solid for the initiator system, if a hydroxyl group or an amino group is present on its surface, it is not necessary that a hydroxyl group or an amino group is present in the inside thereof. That is, an arbitrary solid material wherein a hydroxyl group or an amino group is present on the surface can be used for the initiator system of the present invention. For example, solid materials such as semiconductor substrates, other substrates, particles, fibers and electrodes may be used for the initiator system. Furthermore, it is also made possible to use a polymer obtained by a polymerization method other than radical polymerization and having a hydroxyl group or an amino group (for example, polyester) for an initiator system. Therefore, it becomes easy to produce a block polymer having a moiety obtained by a polymerization method other than radical polymerization and a moiety obtained by living radical polymerization. Conventionally, such synthesis of a block polymer was impossible or complicated due to a large number of stages in the process (although it has been desired in various fields, it has been difficult to make it possible to practically perform it).

Since the initiator system of the present invention has high activity, high temperature (such as 110° C. or higher) is not needed for a polymerization reaction and an amount of the catalyst used can be reduced. Moreover, since the initiator system has high activity, high temperature (such as 110° C. or higher) is not needed for a polymerization reaction such that the amount of the catalyst used can be reduced.

In particular, in an embodiment of using a halogenating agent containing halogenated nitrogen (—NX—), since the halogenating agent also acts as a catalyst, a composition for polymerization can be provided only with 3 kinds of materials consisting of the halogenating agent, an initiating dormant species and a monomer so that the living radical polymerization can be carried out with a simple formulation.

Moreover, the initiator system does not require an expensive and special protecting group for protecting a polymer growing chain during the reaction.

Additionally, molded products, which are obtained from the polymer obtained by the method of the present invention, have the advantage that in which color or odor does not substantially occur on the products during the molding process.

EMBODIMENTS FOR CARRYING OUT THE INVENTION

Figure 1:
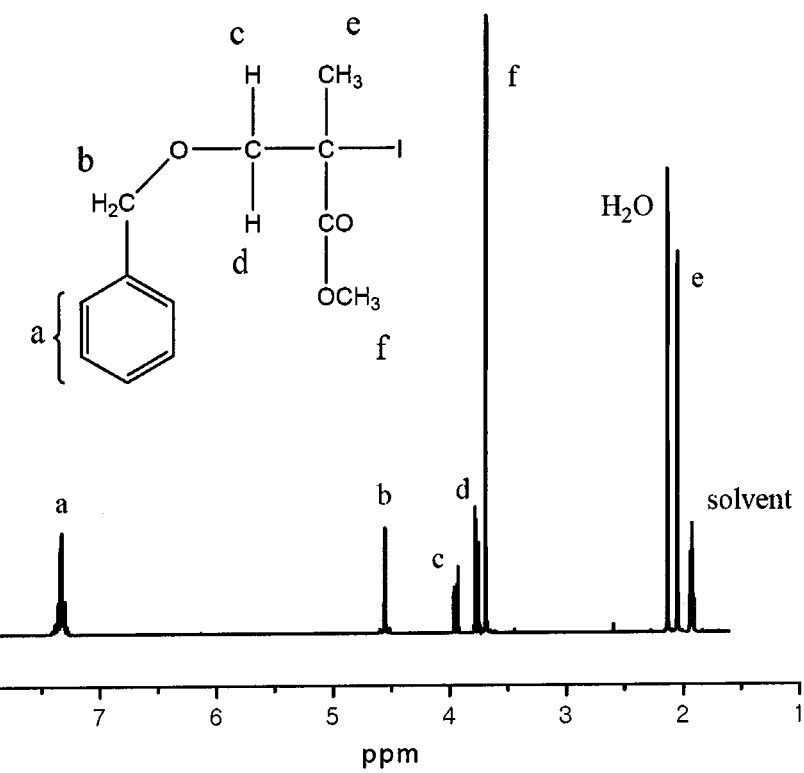
FIG. 1 shows a $^1$H NMR spectrum of a compound 1 (RO-$M_1$-I, R=benzyl).

Hereinafter, the present invention will be explained in further details.

(Summary of the Preferred Embodiments)

In order to facilitate understanding, first, a summary of one preferred embodiment of the present invention will be explained.

Scheme 1a shows a basic process of the living radical polymerization. That is, the living radical polymerization reaction is based on reversible activation reaction of a dormant species ("Polymer-X" in the scheme) to the growing chain radical ("Polymer·" in the scheme).

(Scheme 1a)

Formula 1a

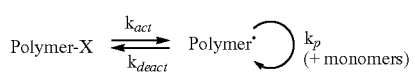

In the case of using NIS (N-iodosuccinimide) as a catalyst (Scheme 1b), the NIS acts as an inactivating agent ("I-A" in the scheme) of the "Polymer·" and an N-succinimide radical (N-succinic acid imide radical) is generated at the site. The N-succinimide radical acts as an activating agent of the Polymer-I and "Polymer·" and NIS are produced. According to the cycle, frequent activation of the Polymer-I is made possible. As to the mechanism, this process is a reversible chain transfer (RT) process using the NIS as a chain transfer agent. By the reversible chain transfer process, the Polymer-I is catalytically activated. Such a chain transfer agent is referred to as a catalyst (in such a sentence).

(Scheme 1b)

Formula 1b

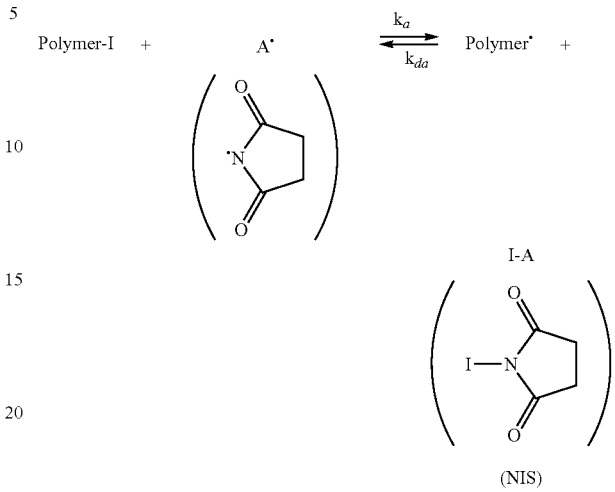

According to the present invention (Scheme 2a), a compound derived from an alcohol compound R—OH (or an amine compound) by a halogenating agent is used as a starting dormant species in place of an isolated alkyl iodide.

(Scheme 2a)

Formula 2a

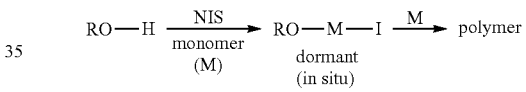

Conventionally, a method of introducing an alcohol compound to a terminal in a living radical polymerization reaction has been studied. The conventional method carries out a process of binding a compound known as a dormant species for the living radical polymerization to the alcohol compound by a method of esterification or amidation, and isolating and purifying an obtained alcohol derivative compound, which is used as a dormant (Scheme 2b).

(Scheme 2b)

Formula 2b

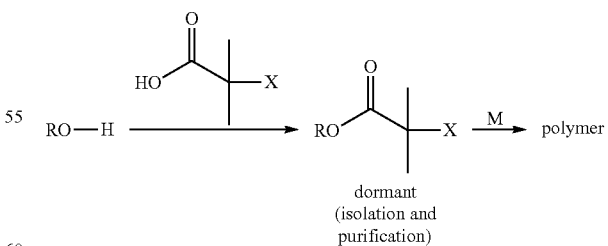

In such a process, since a step of isolating and purifying a dormant species is carried out once, efficiency is low as the entire process of obtaining a desired polymer from the raw material, which is the alcohol compound.

However, according to the method of the present invention, the step of isolating and purifying a dormant species is not necessary. That is, a polymerization reaction can be performed without isolating and purifying the obtained compound after halogenation of an alcohol compound or an amine compound. For example, polymerization reaction can be performed by adding a radical initiator (such as AIBN) and as needed a catalyst after halogenation of an alcohol compound or an amine compound without moving the materials from the reaction vessel where the halogenation reaction was performed.

An alcohol may be halogenated (for example, iodized) with a halogenating agent (for example, an iodizing agent such as NIS) (Scheme 3a).

(Scheme 3a)

Formula 3a

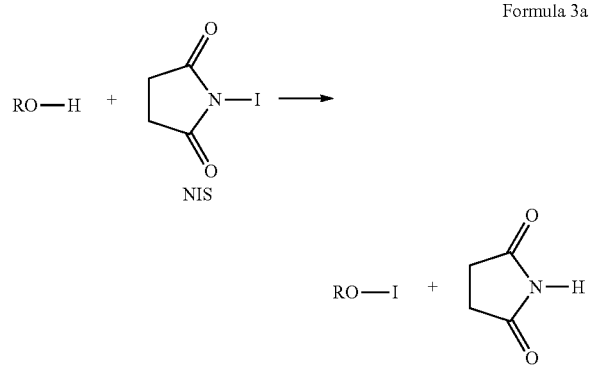

The bond between the halogen and oxygen of the halogenated alcohol can be easily cleaved. An alkoxy radical (RO.) and a halogen radical (such as an iodine radical (I.)) can be generated by applying an energy such as heat (Scheme 3b).

(Scheme 3b)

Formula 3b

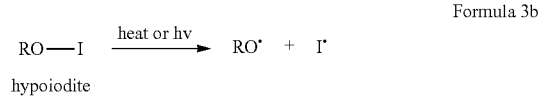

hypoiodite

Here, in the case where R is non-conjugated system (for example, R is an alkyl), by conducting a reaction in the presence of a monomer (M), RO. can be bound to the monomer M. Thereafter, it can be capped with a halogen (such as I.) to form an alkyl halide (such as an alkyl iodide, RO-$M_m$-I) (Scheme 3c). Here, m represents the number of monomer units.

(Scheme 3c)

Formula 3c

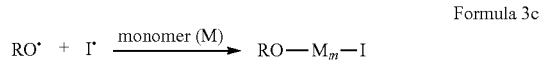

A hypoiodite (RO—I) may also form RO-$M_m$-I by directly reacting with the monomer M by an insertion mechanism.

As mentioned above, the halide (RO-$M_m$-X) derived from an alcohol may be used as a dormant species for living radical polymerization. For example, by mixing a monomer, a radical initiator, a catalyst (such as NIS) and a halide derived from an alcohol, living radical polymerization can be carried out. Further, the halide derived from the alcohol does not require isolation or purification before performing the polymerization. Therefore, after the step of obtaining a halide derived from an alcohol, the polymerization reaction can be carried out in the same vessel without moving the obtained material from the reaction vessel for the halogenating reaction. That is, the entire process of obtaining a polymer from an alcohol compound can be performed in one reaction vessel (so-called one pot process).

Here, as the alcohol compound, an arbitrary alcohol compound may be used as long as the atom bound to its hydroxyl group has a non-conjugated system. Moreover, a hydroxy acid (such as a carboxylic acid) can also be used.

Figure 3:
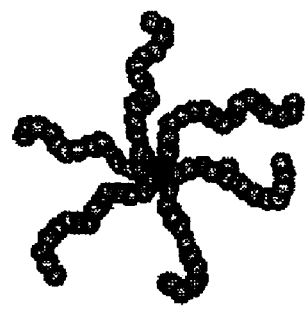
FIG. 3 shows a schematic diagram of a star-type polymer obtained by the method of the present invention.
Figure 4:
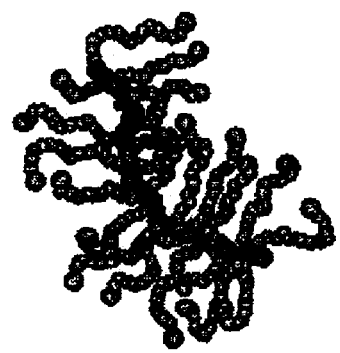
FIG. 4 shows a schematic diagram of a comb-type polymer obtained by the method of the present invention.
Figure 5:
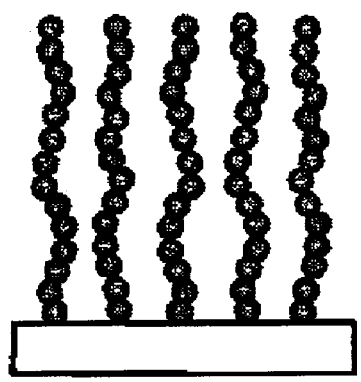
FIG. 5 shows a schematic diagram of a surface graft polymer obtained by the method of the present invention.

A living radical polymer can be obtained using various alcohol compounds so as to have the alcohol compounds bound to the terminal without the need of using a chemical method such as a binding reaction to the dormant species, which has been employed in the conventional techniques. Therefore, a functional group can easily be introduced into the terminal of the polymer to be obtained by the radical polymerization. Moreover, various block polymers can easily be obtained. Polymers of a complicated branched structure can easily be synthesized. For example, in the case of synthesizing a polymer of a complicated branched structure such as a star-type polymer (FIG. 3), or a comb-type polymer (FIG. 4), a polymer having a desired branched structure can be obtained by using a polyol compound corresponding to the desired polymer structure as the material for the starting species.

(Further Detailed Description of the Present Invention)

Hereinbelow, the present invention will be explained further in detail.

First, the terms in the present specification will be explained.

(Living Radical Polymerization)

In the present specification, a "living radical polymerization" refers to a polymerization reaction, in which a chain transfer reaction does not substantially occur in a radical polymerization reaction and a termination reaction does not substantially occur in the radical polymerization reaction, and the growing chain end maintains the activity even after the monomers have been exhaustively reacted. According to this polymerization reaction, after completion of a polymerization reaction, a terminal of the generated polymer maintains the polymerization activity. When a monomer is added, it is possible to start the polymerization reaction again.

A living radical polymerization is characterized in that, for example, a polymer having an arbitrary average molecular weight can be synthesized by adjusting the ratio of concentrations of a monomer and polymerization initiator, and the generated polymer has very narrow molecular weight distribution, and can be applied to a block copolymer. It is noted that a living radical polymerization is sometimes abbreviated as "LRP".

(Alcohol Compound)

In the present invention, as an alcohol compound, a compound having a hydroxyl group, wherein the atom bound to its hydroxyl group has a non-conjugated structure may be used. Here, the alcohol compounds encompass a hydroxy acid (such as a carboxylic acid). That is, a compound whose hydroxyl group composes a part of the hydroxy acid is encompassed.

In the case where the atom bound to the hydroxyl group has a conjugated structure, a radical generated by elimination of the hydrogen of the hydroxyl group is stabilized by resonance. Therefore, it cannot have reactivity sufficient for the starting group. In the case where the atom bound to the hydroxyl group has a non-conjugated structure (for example, carbon having a sp³ hybrid orbital), the radical generated by elimination of the hydrogen of the hydroxyl group is not stabilized by resonance but can have reactivity as the starting group.

Specific examples of the non-conjugated structure include a structure in which the bonds between an atom bound to a hydroxyl group (hereinafter, it is referred to as a "first atom" for convenience) and a plurality of atoms bound to the first atom (hereafter it is referred to as a "second atom" for convenience) are only single bonds. Moreover, even in the case where only the bond between one of a plurality of the second atoms and the first atom is a double bond or a triple bond, if the double bond or the triple bond is of a structure not resonant with another double bond or triple bond, it is a non-conjugated structure.

A hydroxy acid has a double bond between a first atom bound to the hydroxyl group and the oxygen atom which is one of the second atoms. However, it has sufficient reactivity as a starting group. For example, a carboxylic acid has a sp² hybrid orbital. However, it can have sufficient reactivity as the starting group. Therefore, even a hydroxy acid such as a carboxylic acid having a conjugated structure may be used as the starting group.

The alcohol compound may be a compound having one hydroxyl group in the compound, or it may be a compound having two or more hydroxyl groups. For example, polyols having the following structure may be used.

Formula 4

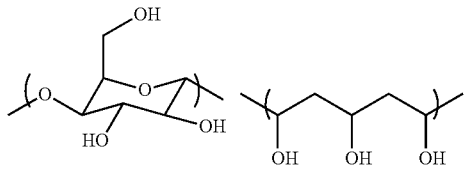

Moreover, the atom bound to the hydroxyl group in the alcohol compound may be carbon or an atom other than carbon. That is, not only organic alcohols, but also inorganic alcohols may be used. Examples of the inorganic alcohols include silanol.

Furthermore, a solid having a hydroxyl group on the surface may be used as the alcohol compound. Generally, it is known that a hydroxyl group is produced on a surface of a solid material by reaction with the moisture in the air by contact of its surface with the air even in the case where the material itself does not have a hydroxyl group. Therefore, even if it is a material not having a hydroxyl group in itself, when a hydroxyl group is produced on the surface by contact with the air, the material may be used as an alcohol compound in the present invention.

Therefore, organic or inorganic solid materials may be used as the alcohol compounds in the present invention. In particular, an inorganic material which is easily reactive with the moisture in the air can be used preferably. Specifically, for example, various solid materials such as a silicon substrate used as a material for a semiconductor substrate, and ITO used as an electrode material can be used as the alcohol compounds.

(Amine Compound)

In the present invention, as an amine compound, a compound having an amino group wherein the atom bound to the amino group has a non-conjugated structure can be used. The amino group may be a primary amino group or a secondary amino group.

In the case where the atom bound to the amino group has a conjugated structure, a radical generated by elimination of the hydrogen of the amino group is stabilized by resonance. Therefore, it cannot have reactivity sufficient for the starting group. In the case where the atom bound to the amino group has a non-conjugated structure (for example, carbon having a sp³ hybrid orbital), the radical generated by elimination of the hydrogen of the amino group is not stabilized by resonance but can have reactivity as the starting group.

In one embodiment, a secondary amine compound can be used. In this case, in a halogenation step, by halogenating the secondary amine compound with a halogenating agent capable of halogenating the hydrogen bound to the nitrogen of the secondary amine, a halogenated derivative compound wherein the hydrogen of the amine compound is substituted with a halogen is produced. In the polymerization step, using a halogenated derivative compound as a dormant species for living radical polymerization, living radical polymerization of a monomer having a radical-reactive unsaturated bond is carried out. Here, a radical produced by elimination of a halogen X from the halogenated derivative compound is allowed to react with an unsaturated bond of the monomer.

(Halogen)

In the present specification, a "halogen" refers to a monovalent radical of an element, which belongs to the 7B group of the periodic table, such as a fluorine (F), chlorine (Cl), bromine (Br) and iodine (I). Preferred is bromine or iodine, and more preferred is iodine.

(Halogenating Agent)

As the halogenating agent, a known halogenating agent can be used.

As the halogenating agent, a halogenating agent whose halogen atom is bound to a nitrogen atom or a carbon atom is preferable. In the case where the halogen atom of the halogenating agent is bound to a nitrogen atom, it is preferable that the nitrogen atom is bound to two carbonyl groups. That is, a halogenating agent having a partial structure of the following formula is preferable.

—C(=O)—NX—C(=O)—

Moreover, in the case where the halogen atom of the halogenating agent is bound to a carbon atom, it is preferable that the carbon atom has a conjugated structure. That is, a halogenating agent having a partial structure of the following formula as the skeleton of its molecule is preferable.

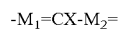
-M$_1$=CX-M$_2$=

In the formula, M$_1$ and M$_2$ are each independently an atom capable of forming a conjugated structure and a hydrogen bound to the atom. For example, a halogenating agent wherein M$_1$ and M$_2$ are CH and having a partial structure of the following formula is preferable.

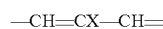
—CH=CX—CH=

NIS, a mixture of PhI(OAc)$_2$ and I$_2$ which are mentioned above and the like can be used preferably.

Moreover, in the case of a halogenating agent wherein the halogen is iodine (that is, an iodizing agent), those including trivalent iodine are preferable.

For example, as a halogenating agent for halogenating an alcohol compound, the following halogenating agents (NIS, or a mixture of PhI(OAc)$_2$ and I$_2$) can be used preferably.

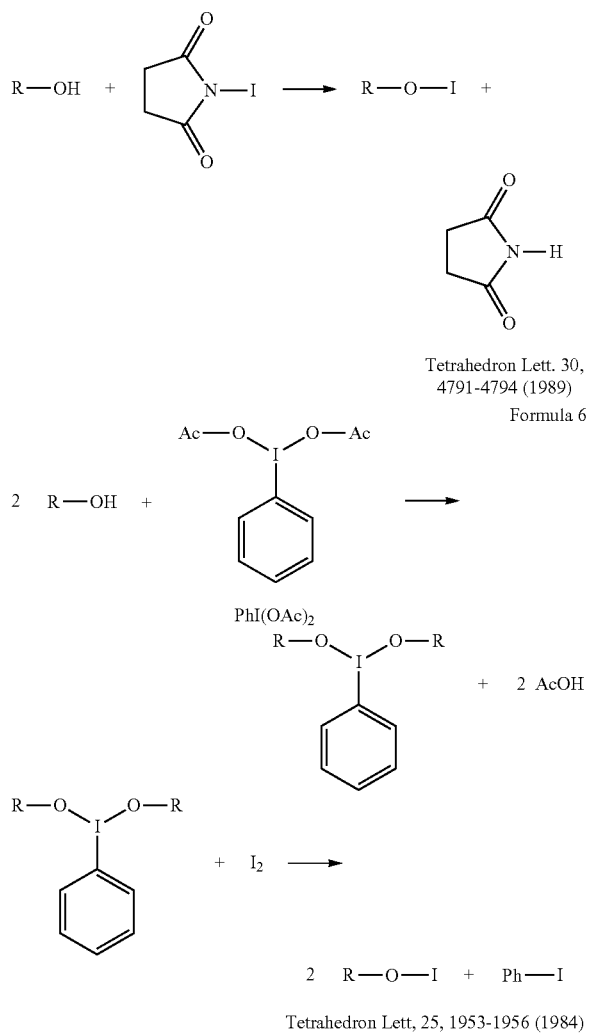

Moreover, as a halogenating agent, a mixture of bis(trifluoroacetoxy iodo) benzene (PhI(OCOCF$_3$)$_2$) and I$_2$ can also be used preferably. Furthermore, as a halogenating agent, a mixture of Hg(OAc)$_2$ and I$_2$ or a mixture of Pb(OAc)$_4$ and I$_2$ can be used as well.

As a halogenating agent for halogenating an amine compound, a known halogenating agent can be used. For example, a mixture of PhI(OAc)$_2$ and I$_2$ and the like can be used preferably.

(Monomer)

As a monomer, the polymerization method of the present invention uses a radical polymerizable monomer. A radical polymerizable monomer refers to a monomer having an unsaturated bond which may be subjected to a radical polymerization under the presence of an organic radical. Such an unsaturated bond may be a double bond or triple bond. That is, the polymerization method of the present invention can use an arbitrary monomer, which is conventionally known as a monomer for performing a living radical polymerization.

That is, in the method of the present invention, according to the mechanism shown in the above-mentioned Scheme 3c, a step of allowing a monomer to react with a radical RO. is repeated. Here, the radical RO has a structure similar to, for example, the radical produced by cleavage of an organic peroxide. Therefore, the radical RO. has the reactivity similar to the radical produced by cleavage of an organic peroxide so that it can be used for polymerization of various monomers similarly to a radical produced by cleavage of an organic peroxide.

More specifically, the so-called vinyl monomers can be used. Vinyl monomer is a general name for monomers which are represented by the general formula "CH$_2$=CR$^5$R$^6$."

A monomer having the general formula in which R$^5$ is methyl, and R$^6$ is carboxylate, is referred to as a methacrylate-type monomer, and can preferably be used in the present invention.

Specific examples of the methacrylate-type monomer include methyl methacrylate, ethyl methacrylate, propyl methacrylate, n-butyl methacrylate, t-butyl methacrylate, hexyl methacrylate, 2-ethylhexyl methacrylate, nonyl methacrylate, benzyl methacrylate, glycidyl methacrylate, cyclohexyl methacrylate, lauryl methacrylate, n-octyl methacrylate, 2-methoxyethyl methacrylate, butoxyethyl methacrylate, methoxytetraethyleneglycol methacrylate, 2-hydroxyethyl methacrylate, 2-hydroxypropyl methacrylate, 3-chloro-2-hydroxypropyl methacrylate, tetrahydrofurfuryl methacrylate, 2-hydroxy-3-phenoxypropyl methacrylate, diethyleneglycol methacrylate, polyethylene glycol methacrylate, 2-(dimethylamino)ethyl methacrylate, and the like. Further, methacrylic acid can be used.

The aforementioned vinyl monomers having the aforementioned general formula in which R$^5$ is hydrogen and R$^6$ is carboxylate, are generally referred to as acrylic type monomers and can preferably be used in the present invention.

Specific examples of the acrylate-type monomer include methyl acrylate, ethyl acrylate, propyl acrylate, n-butyl acrylate, t-butyl acrylate, hexyl acrylate, 2-ethylhexyl acrylate, nonyl acrylate, benzyl acrylate, glycidyl acrylate, cyclohexyl acrylate, lauryl acrylate, n-octyl acrylate, 2-methoxyethyl acrylate, butoxyethyl acrylate, methoxytetraethyleneglycol acrylate, 2-hydroxyethyl acrylate, 2-hydroxypropyl acrylate, 3-chloro-2-hydroxypropyl acrylate, tetrahydrofurfuryl acrylate, 2-hydroxy-3-phenoxypropyl acrylate, diethyleneglycol acrylate, polyethylene glycol acrylate, 2-(dimethylamino) ethyl acrylate, and the like. Further, an acrylic acid can be used.

A monomer having the aforementioned general formula of a vinyl monomer, in which R$^5$ is hydrogen and R$^6$ is phenyl, is styrene, can be suitably used in the present invention. A monomer, in which R$^6$ is phenyl or a phenyl derivative, is referred to as a styrene derivative, can be suitably used in the present invention. Specifically, such a monomer includes o-, m-, or p-methoxystyrene, o-, m-, or p-t-butoxystyrene, o-, m-, or p-chloromethylstyrene, o-, m-, or p-chlorostyrene, o-, m-, or p-hydroxystyrene, o-, m-, or p-styrenesulfonic acid and the like. Further, a monomer in which R$^6$ is aromatic, (for example, vinylnaphthalene) can be used.

A monomer having the aforementioned general formula of a vinyl monomer, in which R$^5$ is hydrogen and R$^6$ is alkyl, is alkylene, can be suitably used in the present invention.

In the present invention, monomers having two or more vinyl groups can be also used. Specifically, for example, a diene-type compounds (e.g., butadiene, isoprene, and the like), a compound having two allyl groups (for example, diallyl phthalate and the like), a dimethacrylate having two methacryl groups (e.g., ethylene glycol dimethacrylate), a diacrylate having two acryl groups (e.g., ethylene glycol diacrylate), and the like, can be used.

Vinyl monomers other than those described above can also be used in the present invention. Specifically, for example, vinyl esters (for example, vinyl acetate, vinyl propionate, vinyl benzoate, vinyl acetate), styrene derivatives other than the aforementioned styrene derivatives (for example, α-methylstyrene), vinyl ketones (for example, vinyl methyl ketone, vinyl hexyl ketone, methyl isopropenyl ketone), N-vinyl compounds (for example, N-vinyl pyrrolidone, N-vinyl pyrrole, N-vinyl carbazole, N-vinyl indole), (meth)acrylamide and its derivatives (for example, N-isopropyl acrylamide, N-isopropylmethacrylamide, N,N-dimethylacrylamide, N,N-dimethylmethacrylamide, N-methylolacrylamide, N-methylolmethacrylamide), acrylonitrile, methacrylonitrile, maleic acid and its derivatives (for example, maleic anhydride), halogenated vinyls (for example, vinyl chloride, vinylidene chloride, tetrachloroethylene, hexachloropropylene, vinyl fluoride), olefins (for example, ethylene, propylene, 1-hexene, cyclohexene), and the like.

One of these monomers may be used alone, or a combination of two or more of the monomers may be used.

There is no particular limitation to the combinations of the aforementioned monomer and the alcohol compound or amine compound. An alcohol compound or amine compound, which is arbitrarily selected, may be used for a monomer, which is arbitrarily selected.

(Radical Reaction Initiator)

In the living radical polymerization method of the present invention, if necessary, an adequate amount of a radical reaction initiator is used. Initiators, which are known as initiators to be used for a radical reaction, can be used as the radical reaction initiator. For example, azo-type radical reaction initiators and peroxide-type radical initiators can be used. Specific examples of azo-type radical reaction initiators include, for example, 2,2'-azobis(isobutyronitrile), 2,2'-azobis(2-methylbutyronitrile), 2,2'-azobis(2,4-dimethoxyvaleronitrile), and 2,2'-azobis(4-dimethoxy-2,4-dimethylvaleronitrile). Specific examples of peroxide-type radical reaction initiators include, for example, benzoylperoxide, dicumyl peroxide, t-butyl peroxybenzoate (BPB), di(4-tert-butylcyclohexyl) peroxydicarbonate (PERKADOX16), and potassium peroxodisulfate.

The amount of the radical initiator used is not particularly limited. However, preferably, the amount is 1 millimole or more to 1 liter of the reaction solution. More preferably, the amount is 5 millimoles or more to 1 liter of the reaction solution. Further preferably, the amount is 10 millimoles or more to 1 liter of the reaction solution. Additionally, the amount is preferably 500 millimoles or less to 1 liter of the reaction solution. More preferably, the amount is 100 millimoles or less to 1 liter of the reaction solution. Further preferably, the amount is 50 millimoles or less to 1 liter of the reaction solution.

It is noted that the radical initiator may be added before performing the halogenating reaction or it may be added immediately before conducting the polymerization reaction after performing the halogenating reaction. It is preferable to add it immediately before conducting the polymerization reaction after performing the halogenating reaction.

(Catalyst)

According to the present invention, as a catalyst for the living radical polymerization method, known catalysts may be used. At the time of the living radical polymerization, the catalyst abstracts a halogen from a dormant species to generate a radical. Therefore, according to the present invention, the catalyst detaches a group of the compound used as a dormant species, which suppresses a growing reaction, and converts the compound to an active species, thereby controlling the growing reaction.

Specifically, for example, known catalysts such as complexes having Cu, Ru, Fe, Ni or the like as a central metal disclosed in Patent Document 1, copper complex catalysts disclosed in Non-Patent Document 1, compounds having Ge, Sn or the like as a central metal disclosed in Non-Patent Document 2 and Patent Document 3, phosphorus compounds disclosed in Non-Patent Document 3, and compounds having nitrogen or phosphorus as a central metal disclosed in Patent Document 4 can be used. Moreover, catalysts having an oxygen atom as the central element can also be used. Furthermore, catalysts having a carbon atom as the central element can be used as well.

More specifically, for example, the following compounds can be used as the catalyst:

(1) compounds including at least one central element selected from germanium, tin and antimony, and at least one halogen atom bound to the central element, (2) compounds including at least one central element selected from nitrogen and phosphorus, and at least one halogen atom bound to the central element, (3) compounds including at least one central element consisting of oxygen, a halogen atom binding to the central element, and a carbon atom, a silicon atom, a nitrogen atom or a phosphorus atom bound to the central element, (4) compounds including at least one central element consisting of carbon, and a halogen atom binding to the central element, wherein the central element is further bound to two or three electron-withdrawing substituents or substituents forming a resonance structure together with the central element, wherein when the number of substituents is two, the two substituents may be linked to each other such that the central element and the two substituents form a ring structure, and when the number of substituents is three, two of the three substituents may be linked to each other such that the two linked substituents and the central element form a ring structure, or the three substituents may be linked to one another to form a ring structure, and the substituent bound to the central element stabilizes a carbon radical that is generated by elimination of a halogen atom from the central element, and (5) compounds including at least one central element consisting of carbon, and a halogen atom bound to the central element, wherein the central element is further bound to two or three electron-donating substituents capable of stabilizing a carbon radical generated by elimination of a halogen atom from the central element, wherein when the number of substituents is two, the two substituents may be linked to each other such that the central element and the two substituents form a ring structure, and when the number of substituents is three, two of the three substituents may be linked to each other such that the two linked substituents and the central element form a ring structure, or the three substituents may be linked to one another to form a ring structure.

In the present specification, a "central element" refers to an atom which is bound to a halogen atom and contributes mainly to a catalytic action among atoms constituting a compound that becomes a catalyst.

Moreover, the catalyst may be a so-called precursor-type catalyst. Therefore, in the present specification, the catalysts are referred to as the "catalysts" including the so-called precursor-type catalysts unless otherwise specified.

For example, examples of the precursor-type catalysts include a compound capable of generating an activated radical by reaction with a radical generated from a radical initiator. More specifically, it is possible to use a mechanism in which a radical generated from the radical initiator abstracts a hydrogen atom from a hydroxyl group or the like in the precursor-type catalyst compound to generate an activated radical so that the generated activated radical acts as a catalyst.

Here, in the case where the central element of the catalyst is carbon, nitrogen, oxygen or phosphorus, it is preferable that the central element has a conjugated structure. That is, it is preferable that the central element is further bound to an electron-withdrawing substituent or a substituent forming a resonance structure together with the central element.

The amount of a catalyst used can be limited to an amount smaller than the so-called "solvent amount" (that is, an amount needed to achieve an effect as a solvent). According to the method of the present invention, a catalyst may be used in an amount that is sufficient to catalyze a living radical polymerization, as described above, and there is no need to add more than that.

Specifically, for example, in a preferred embodiment, it is possible that the catalyst in an amount of 10 millimoles (mM) or less is used to one liter of reaction solution. In a further preferred embodiment, it is possible that the catalyst in an amount of 5 millimoles (mM) or less is used to one liter of reaction solution. It is also possible that the catalyst in an amount of 2 millimoles (mM) or less is used to one liter of reaction solution. Further, it is possible that the catalyst in an amount of 1 millimole (mM) or less is used to one liter of reaction solution. It is also possible that the catalyst in an amount of 0.5 millimoles (mM) or less is used to one liter of reaction solution. Regarding the weight of the catalyst, the amount of the used catalyst can be 1% by weight or less in a reaction solution. In a preferred embodiment, it is possible to limit the amount to 0.75% by weight or less, and it is also possible to limit the amount to 0.70% by weight or less. In a more preferred embodiment, it is possible to limit the amount to 0.5% by weight or less, and is also possible to limit the amount to 0.2% by weight or less. It is further possible to limit the amount to 0.1% by weight or less, and is possible to limit the amount to 0.05% by weight or less. In other words, the amount can be limited to a "remarkably" smaller amount than an amount needed to achieve the effect as a solvent.

In one embodiment, according to the present invention, as a halogenating agent, a compound having a catalytic action may be used. For example, in the case of using a compound having the structure of the formula 4 wherein a halogen is bound to nitrogen as the halogenating agent, the nitrogen can act as the central element of the catalyst so that it serves as a living radical polymerization reaction catalyst in the polymerization reaction.

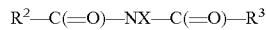

$$R^2-C(=O)-NX-C(=O)-R^3 \qquad \text{Formula 4}$$

In the case of using such a halogenating agent, polymerization can be carried out with a raw material composition which does not include a catalyst other than the halogenating agent.

(Solvents)

When a reaction mixture of a monomer and other ingredients is liquid at the reaction temperature, it is not always necessary to use a solvent. If necessary, a solvent may be used. A solvent may be used in a halogenation step or a polymerization step, or a solvent may be used in both the halogenation step and the polymerization step. If there is no necessity, it is possible that no solvent is used in both the halogenation step and the polymerization step. In the case of performing the polymerization step after the halogenation step and a solvent is used in both the halogenation step and the polymerization step, the solvents may be the same or different. However, it is preferable to use the same solvent. That is, it is preferable to use the solvent used in the halogenation step also in the polymerization step without a change.

Solvents, which were conventionally used for a living radical polymerization, can be used in the method of the present invention. When a solvent is to be used, the amount of use is not particularly limited as long as the halogenation step and the polymerization reaction are appropriately carried out; however, it is preferable to use a solvent in an amount of 1 part by weight or more relative to 100 parts by weight of the monomer, more preferable to use 10 parts by weight or more, and even more preferable to use 50 parts by weight or more relative to 100 parts by weight of the monomer. When the amount of use of the solvent is too small, the viscosity of the reaction solution may be excessively high. Furthermore, it is preferable to limit the amount to 2000 parts by weight or less, more preferable to limit the amount to 1000 parts by weight or less, and even more preferable to limit the amount to 500 parts by weight or less relative to 100 parts by weight of the monomer. When the amount of use of the solvent is too large, the monomer concentration in the reaction solution may be excessively low.

Emulsion polymerization, dispersion polymerization or suspension polymerization can also be carried out by using a solvent that is not miscible with the monomer. For example, in the case of using styrene or methacrylate as the monomer, water can be used as the solvent, such that emulsion polymerization, dispersion polymerization or suspension polymerization can be carried out.

(Other Additives and the Like)

To the various aforementioned materials used for the living radical polymerization, known additives may be added as necessary, in their required amounts. Examples of such additives include, for example, a polymerization suppressant and the like.

(Conventional Dormant Species)

In the method of the present invention, since the above-mentioned dormant species is used, basically, it is not necessary to use a conventional low molecular weight dormant species. However, if necessary, conventional low molecular weight dormant species, such as an organic halide having a carbon-halogen bond, may be used in combination. However, in order to obtain only a polymer having a desired alcohol compound or amine compound as a terminal with high purity, it is preferable that the conventional low molecular weight dormant species is not substantially included in the raw material composition.

(Raw Material Composition)

By mixing the various raw materials described above, a raw material composition that is appropriate as a material for the living radical polymerization, is obtained. The obtained composition can be used in the conventionally known methods for a living radical polymerization.

According to one embodiment, the raw material composition does not include any raw material other than the various raw materials mentioned above. For example, it is preferable, from the viewpoint of environmental problems and the like, that the raw material composition does not substantially include a raw material containing a transition metal. According to a preferred embodiment, the raw material composition does not substantially include any raw material other than an initiator, a catalyst, a catalyst precursor compound, a monomer having a radical-reactive unsaturated bond, a solvent, and materials used for a dormant species (an alcohol compound or amine compound and a halogenating agent). It is also preferable that the raw material composition does not substantially include any material irrelevant to a living radical polymerization (for example, an episulfide compound or the like).

It is noted that in the present specification, "does not substantially include" denotes that the content is of an amount that does not influence on the method of the present invention. For example, when a substance is not substantially included, the content is preferably 1% or less, more preferably 0.1% or less, and further preferably 0.01% or less in the raw material composition. The content is particularly preferably 0.001% or less, 0.0001% or less, or 0.00001% or less. The content is most preferably 0%.

In one embodiment, the raw material composition includes an alcohol compound or an amine compound, a halogenating agent, a radical initiator, a catalyst or a catalyst precursor, and a monomer having a radical-reactive unsaturated bond, and may further include a solvent.

Moreover, in the case of using as a halogenating agent a compound capable of acting also as a catalyst such as NIS, it is possible that the raw material composition does not substantially include a catalyst or a catalyst precursor other than the halogenating agent.

(Halogenation Step)

According to the method of the present invention, a step of halogenating an alcohol compound or an amine compound is carried out. According to this step, a halide usable as a low molecular weight dormant species in the living radical polymerization method is synthesized.

In the halogenation step, for example, in the case of using an alcohol compound, the following step is carried out.

That is, an alcohol compound of the formula 1 is halogenated with a halogenating agent capable of halogenating an alcohol, to produce a compound of the formula 2 wherein the hydrogen of the alcohol is substituted with a halogen.

$$R^1OH \qquad \text{Formula 1}$$

$$R^1OX \qquad \text{Formula 2}$$

Here, $R^1$ is an arbitrary group capable of forming an alcohol compound by being bound to OH, X is a halogen, and an atom bound to the hydroxyl group of the alcohol compound of the formula 1 has a non-conjugated structure. Here, the alcohol compound of the formula 1 may be a hydroxy acid.

Moreover, in the case of using an amine compound, for example, the following step is carried out.

The amine compound of the formula 5 is halogenated with a halogenating agent capable of halogenating an amine, to produce a compound of the formula 6 wherein the hydrogen of the amine is substituted with a halogen.

$$R^5NHR^6 \qquad \text{Formula 5}$$

$$R^5NXR^6 \qquad \text{Formula 6}$$

Here, X is a halogen, and an atom bound to the amino group of the amine compound of the formula 5 has a non-conjugated structure.

As the reaction condition for the halogenation step, an arbitrary reaction condition can be used as long as the halogenating reaction can proceed.

At the time of the halogenation step, as needed, a solvent may be used. Moreover, in the case where the monomer used for the polymerization is liquid, the monomer for polymerization may be used as the solvent for the halogenation step.

(Reaction Temperature)

The reaction temperature in the halogenation step of the method of the present invention is not particularly limited. It is preferably 10° C. or higher, more preferably 20° C. or higher, further preferably 30° C. or higher, even more preferably 40° C. or higher, and particularly preferably 50° C. or higher. Moreover, it is preferably 130° C. or lower, more preferably 120° C. or lower, further preferably 110° C. or lower, even more preferably 105° C. or lower, and particularly preferably 100° C. or lower.

In the case where the temperature is too high, it is disadvantageous in that much cost is required for heating equipment and the like. In the case where the temperature is lower than room temperature, it is disadvantageous in that much cost is required for equipment for cooling and the like. Moreover, in the case where the reaction mixture is prepared to be polymerizable at room temperature or lower, since the reaction mixture is unstable at room temperature so as to be reacted, it is disadvantageous in that storage of the reaction mixture is difficult. Therefore, the above-mentioned temperature range slightly higher than room temperature and not excessively high (for example, from 50° C. to 100° C.) is very preferable in a practical sense.

(Reaction Period of Time)

The reaction time period in the method of the present invention is not particularly limited. Preferably, the reaction time period is 15 minutes or more. More preferably, the reaction time period is 30 minutes or more. Further preferably, the reaction time period is 1 hour or more. Additionally, the reaction time period is preferably 3 days or less. More preferably, the reaction time period is 2 days or less. Further preferably, the reaction time period is 1 day or less.

If the reaction time period is too short, it is difficult to obtain a halogenated derivative sufficiently. If the reaction time period is too long, the efficiency of the entire process would be unsatisfactory.

(Atmosphere)

The halogenating reaction in the method of the present invention may be carried out under a condition where air is present in the reaction vessel. Further, if necessary, the air may be replaced with an inert gas such as nitrogen or argon.

(Polymerization Step)

According to the method of the present invention, a polymerization step is carried out using the halogenated derivative compound obtained in the above-mentioned halogenation step.

In the polymerization step, polymerization is carried out using the halogenated derivative compound obtained in the above-mentioned halogenation step, a monomer, and a catalyst necessary for the polymerization reaction. Basically, the polymerization reaction can be carried out in the same manner as in an ordinary polymerization reaction except that the halogenated derivative compound obtained in the above-mentioned halogenation step is used. For example, polymerization can be carried out by adding materials necessary for the polymerization reaction such as a monomer and a catalyst to the halogenated derivative compound obtained in the above-mentioned halogenation step. Moreover, polymerization can also be started by obtaining a halogenated derivative compound dissolved in a monomer using a monomer for polymerization as a solvent for the halogenation step, and adding thereto the materials other than the monomer necessary for the polymerization reaction such as a catalyst.

In the polymerization step, it is possible to conduct an arbitrary radical polymerization reaction for which a halogen of the halogenated derivative compound can be used. It is preferably a polymerization reaction using the halogenated derivative compound as a dormant species for utilizing the halogen exchange between the dormant species and the growing chain radical for the reaction control.

For example, in the case of using an alcohol compound in the above-mentioned halogenation step, living radical polymerization of a monomer having a radical-reactive unsaturated bond can be carried out using a halogenated derivative compound, that is, a compound of the above-mentioned formula 2, as a dormant species for the living radical polymerization. Here, a radical of the formula 3 generated by elimination of the halogen X from the alcohol compound is allowed to react with the unsaturated bond of the monomer.

   Formula 3

Moreover, for example, in the case of using the amine compound in the above-mentioned halogenation step, living radical polymerization of a monomer having a radical-reactive unsaturated bond can be carried out using a halogenated derivative compound, that is, a compound of the above-mentioned formula 6 as a dormant species for the living radical polymerization. Here, a radical of the formula 7 generated by elimination of the halogen X from the amine compound is allowed to react with the unsaturated bond of the monomer.

   Formula 7

The polymerization step can be carried out after the halogenation step, and can be carried out successively to the halogenation step. Moreover, the polymerization step can also be carried out simultaneously with the halogenation step. The step is preferably carried out successively to the halogenation step.

The polymerization step can be carried out in the same reaction vessel as in the halogenation step. The polymerization step may be carried out in another reaction vessel, however, in terms of the process efficiency, the step is preferably performed in the same vessel.

The radical initiator used for the polymerization step (such as AIBN) may be added before or in the middle of the halogenation step, or it may be added after completion of the halogenation step.

Examples of the preferable polymerization reaction in the polymerization step include reversible chain transfer catalyzed polymerization (RTCP), atom transfer radical polymerization (ATRP), redox polymerization using an organic compound as a catalyst and iodine transfer polymerization.

As the reversible chain transfer catalyzed polymerization (RTCP), a reaction using a germanium compound, a tin compound, an antimony compound, a nitrogen compound, a phosphorus compound, a carbon compound, an oxygen compound, or the like as a catalyst can be used in the present invention. Here, in the case of using a germanium compound, a tin compound, an antimony compound, a nitrogen compound, a phosphorus compound, a carbon compound or an oxygen compound as a catalyst, the compound used as the catalyst includes a central element selected from germanium, tin, antimony, nitrogen, phosphorus, carbon and oxygen, and at least one halogen atom bound to the central element. In the reversible chain transfer catalyzed polymerization, a catalyst compound having a central element bound to the halogen atom catalyzes the reversible activation reaction from the dormant species of the above-mentioned Scheme 1a (Polymer-X) to the growing chain radical (Polymer.).

In the case of using a reversible chain transfer catalyzed polymerization, for example, polymerization can be carried out by adding a catalyst for the reversible chain transfer catalyzed polymerization to the halide obtained in the above-mentioned halogenation step.

In one embodiment, NIS (N-iodosuccinimide) can be used as a catalyst for the reversible chain transfer catalyzed polymerization. Since NIS can be used as a catalyst for the above-mentioned halogenation step, it can act as a catalyst for both the halogenation step and the polymerization step. In one preferable embodiment, the halogenation step is carried out using NIS, and subsequently the polymerization step may be carried out by adding a material for the polymerization (such as a radical initiator) in the presence of NIS.

As the atom transfer radical polymerization (ATRP), a reaction using, as a catalyst, a transitional metal complex compound such as a copper complex compound or the like is known. Any known atom transfer radical polymerization can be utilized for the present invention.

Moreover, as a catalyst for the redox polymerization using an organic compound as a catalyst, it is possible to use a catalyst which is an organic compound having oxidation-reduction ability and which carries out the catalytic reaction of the living radical polymerization by the reversible redox reaction between the reduced state and the oxidized state of the organic compound.

In this type of the catalyst, preferably, a central element which is oxidized or reduced at the time of the reversible redox reaction is selected from nitrogen, carbon, phosphorus, sulfur, and oxygen, and the central element in the oxidized state has a positive charge or a positive partial charge. Specifically, the catalyst is selected from the following group of the organic compounds, for example:

triethylamine;
tributylamine;
tetrakis dimethyl amino amine;
1,4,8,11-tetramethyl-1,4,8,11-tetraazacyclotetradecane;
tributyl phosphine;
triphenyl phosphine;
bis(ethylenedithio)tetrathiafulvalene (BTTF);
ethylenediamine;
dimethyl ethylenediamine;
tetramethyl ethylenediamine;
tetramethyl diaminomethane;
tris(2-aminoethyl)amine;
tris(2-(methylamino)ethyl)amine;
1,2-bis(diphenylphosphino)methane; and
haematoporphylin.

Moreover, as an inducer for the iodine transfer polymerization, an organic compound which gives a growing chain radical and carries out the living radical polymerization by the iodine reversible exchange reaction (reversible activation reaction) by the growing chain radical can be used as well. Examples of such a compound include an azo compound and a peroxide.

In the case of using the atom transfer radical polymerization (ATRP), the redox polymerization using an organic compound as a catalyst, or the iodine transfer polymerization, polymerization can be carried out by, for example, adding to the halide obtained in the above-mentioned halogenation step a catalyst for the atom transfer radical polymerization, a catalyst for the redox polymerization using an organic compound as the catalyst, and an inducer for the iodine transfer polymerization, respectively.

(Reaction Temperature)

A reaction temperature in the polymerization step of the present invention is not particularly limited. Preferably, the reaction temperature is 10° C. or more. More preferably, the reaction temperature is 20° C. or more. Further preferably, the reaction temperature is 30° C. or more. Still preferably, the reaction temperature is 40° C. or more. Particularly preferably, the reaction temperature is 50° C. or more. Additionally, the reaction temperature is preferably 130° C. or less. More preferably, the reaction temperature is 120° C. or less. Further preferably, the reaction temperature is 110° C. or less. Still preferably, the reaction temperature is 105° C. or less. Particularly preferably, the reaction temperature is 100° C. or less.

When the temperature is too high, there is a disadvantage in that heating facilities and the like may be expensive. When the temperature is at room temperature or lower, there is a disadvantage that cooling facilities and the like may be expensive. Additionally, if a reaction mixture is prepared such that polymerization occurs at room temperature or lower, the reaction mixture is unstable at room temperature and may react. Therefore, there is the disadvantage that it is difficult to store the reaction mixture. Therefore, the aforementioned range of the temperature, which is slightly higher than room temperature but is not too high (for example, 50° C. to 100° C.) is very preferable in terms of practical sense.

It is noted that in the case of performing the polymerization step after the halogenation step, the reaction temperature of the polymerization step may be different from or the same as the reaction temperature of the halogenation step.

(Reaction Period of Time)

The reaction time period in the polymerization step of the present invention is not particularly limited. Preferably, the reaction time period is 15 minutes or more. More preferably, the reaction time period is 30 minutes or more. Further preferably, the reaction time period is 1 hour or more. Additionally, the reaction time period is preferably 3 days or less. More preferably, the reaction time period is 2 days or less. Further preferably, the reaction time period is 1 day or less.

If the reaction time period is too short, it is difficult to obtain a sufficient molecular weight (or a ratio of polymerization (conversion ratio of monomer)). If the reaction time period is too long, the efficiency of the entire process would be unsatisfactory. Advantageous results (an adequate monomer conversion and reduction of a side reaction) may be achieved by selecting a suitable reaction time period.

(Atmosphere)

The polymerization reaction in the method of the present invention may be carried out under a condition where air is present in the reaction vessel. Further, if necessary, the air may be replaced with an inert gas such as nitrogen or argon. It is noted that in the case of performing the polymerization step after the halogenation step, the atmosphere of the polymerization step may be different from or the same as the atmosphere of the halogenation step.

(Polymer)

A desired polymer is obtained by the above-mentioned method. The obtained polymer has a structure wherein a residue of the alcohol compound or the amine compound is present at its terminal and the monomer residue is directly bound to the residue of the alcohol compound or the amine compound.

That is, in the case of using an alcohol compound ROH, a monomer M and a halogen X, the structure of the obtained polymer is as follows.

$$RO\text{-}M_m\text{-}X$$

In the formula, RO is a residue of an alcohol compound, and m is the number of the monomer units. Therefore, m is determined based on the number of repeating the step of binding one monomer to the growth terminal. If the polymerization reaction is finished at the time one monomer is bound, m is 1. If the polymerization reaction is finished at the time 100,000 monomers are bound, m is 100,000. Therefore, the lower limit of m is 1. As to the upper limit of m, it is not limited as long as the step of binding the monomer can be repeated. For example, a polymer wherein m is 10,000, 100,000 or 1,000,000 can be synthesized.

In the case where the alcohol compound is a compound having a plurality of hydroxyl groups, with the number of the hydroxyl groups being n, the structure of a polymer to be obtained is as follows.

$$R(O\text{-}M_m\text{-}X)_n$$

n is a natural number, and the upper limit is not particularly limited. That is, by using an alcohol compound having a large number of hydroxyl groups, the value of n can be increased. For example, since a silicon substrate or the like has an extremely large number of hydroxyl groups on the surface of a gigantic molecule, a polymer having an extremely large n value can be synthesized.

In the case of using an amine compound $R^aR^bNH$, a monomer M and a halogen X, the structure of the obtained polymer is as follows.

$$R^aR^bn\text{-}M_n\text{-}X$$

In the formula, $R^aR^bN$ is a residue of an amine compound, and m is the number of the monomer units. Therefore, m is determined based on the number of repeating the step of binding one monomer to the growth terminal. The lower limit of m is 1. As to the upper limit of m, it is not limited as long as the step of binding the monomer can be repeated. For example, a polymer wherein m is 10,000, 100,000 or 1,000,000 can be synthesized.

In the case where the amine compound is a compound having a plurality of hydroxyl groups, assuming that the number of the hydroxyl groups is n, the structure of the obtained polymer is as follows.

$$R^aR^b(N\text{-}M_m\text{-}X)_n$$

n is a natural number, and the upper limit is not particularly limited. That is, by using a polyamine compound having a large number of amino groups, the value of n can be increased.

(Removal of Halogen Bound to an End of Produced Polymer)

The produced polymer that is obtained by the method of the present invention has halogen (for example, iodine) at the chain end. When this polymer is to be used in products, if needed, the polymer can be used after removing the halogen at the end. It is also possible to positively utilize the halogen at the end and to convert this into a different functional group, so as to bring out a new function. The reactivity of the halogen at the end is generally high, and the removal or conversion of the halogen can be carried out by a wide variety of reactions. For example, examples of methods of treating the polymer end when the halogen is iodine, will be shown in the following scheme. The polymer end can be utilized by the reactions shown in these schemes or the like. Even when the halogen is other than iodine, the polymer end can be converted into functional group in the same manner.

(Scheme A)

Conversion of terminal iodine

Formula 7

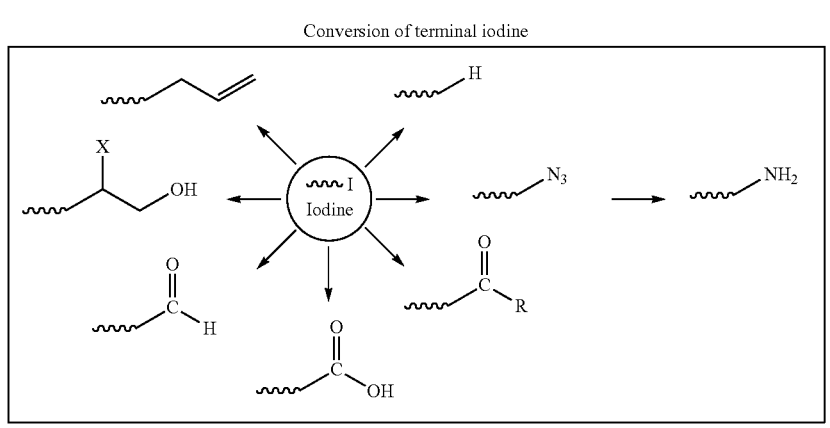

(Reference) Matyjaszewski, K., Davis, T. P., Eds.; *Handbook of Radical Polymerization*; Wiley & Sons: New York, 2002.

Simple removal/conversion of terminal iodine

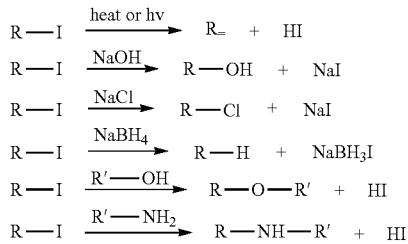

(Use of the Polymer)

According to the aforementioned living radical polymerization method of the present invention, a polymer having narrow molecular weight distribution is obtained.

For example, it is possible to select a suitable formulation of reaction material, reaction conditions and the like, such that a polymer having the $M_w/M_n$ ratio, which is the ratio of the weight average molecular weight Mw to the number average molecular weight $M_n$, is 1.5 or less. It is also possible to select a further suitable formulation of the reaction material and reaction conditions such that a polymer having the $M_w/M_n$ ratio of 1.4 or less, a polymer having the $M_w/M_n$ ratio of 1.3 or less, a polymer having the $M_w/M_n$ ratio of 1.2 or less, or a polymer having the $M_w/M_n$ ratio of 1.1 or less is obtained.

The polymer obtained by the living radical polymerization method of the present invention can be applied for various uses. For example, the polymer can be used for manufacturing materials for resistor, adhesives, lubricants, paint, ink, dispersants, packaging materials, pharmaceuticals, personal care products (such as hairdressing material, cosmetics, and the like), elastomers (such as material for automobiles, industrial articles, sports article, materials for coating electrical wire, materials for buildings, and the like), coating materials (such as materials for powder coating, and the like), and the like. Furthermore, it can be used for creating a new electronic material, optical material, dynamic material, crystal material, separation material, lubricant material, and medical material.

The polymer obtained by the living radical polymerization method of the present invention can also be advantageously used in various applications from the viewpoint that the amount of catalyst remaining in the polymer is low. That is, since the amount of catalyst can be decreased relative to the conventional transition metal-based catalysts and the like, the obtained resins acquire high purity, and the polymer can be suitably used in the applications where a high purity resin is required. The catalyst residue may be removed from the produced polymer, or may not be removed, depending on the application. The polymer may be molded, or dissolved or dispersed in a solvent or a dispersion medium depending on the various applications. However, the molded polymer, or the dissolved or dispersed polymer also maintains the advantages of the present invention, and thus these polymers still belong to the scope of the polymer obtained by the polymerization method of the present invention.

The polymer synthesized using the polymerization method of the present invention has advantages such as the advantage that the molecular weight distribution is narrow, the advantage that the amount of catalyst remaining in the polymer is low, and the advantage that the cost is low, and thus the polymer can be utilized in various applications by making the best use of these advantages.

For example, a homopolymer, a random copolymer and a block copolymer formed from benzyl methacrylate and having narrow molecular weight distribution, can be used as high performance materials for resistor.

Further, for example, a polymer of methacrylate (for example, dimethylaminomethacrylate or 2-hydroxyethyl methacrylate), methacrylic acid, acrylate, acrylic acid or the like can be used in applications such as adhesives, paints, inks and pigment dispersants.

Further, when a polybranched polymer is synthesized by the method of the present invention, the polymer is useful as a lubricant.

Further, polymers obtained by the method of the present invention (for example, hydroxyethyl methacrylate, polyethylene glycol methacrylate, and the like) are also useful as drug sustained-release materials or medical materials.

Further, polymers obtained by the method of the present invention (for example, dimethylaminomethacrylate, methacrylic acid, 2-hydroxyethyl methacrylate, polyethylene glycol methacrylate, and the like) are also useful for personal care products (for example, hairdressing materials or cosmetic products).

Further, polymers obtained by the method of the present invention (for example, acrylate, methacrylate, styrene, diene and the like) are also useful in applications such as elastomer or coating.

Further, polymers obtained by the method of the present invention are also useful in the creation and production of non-conventional new electronic materials, optical materials, mechanical materials, crystalline materials, separation materials, lubricant materials, medical materials and the like.

Furthermore, the method of the present invention can be, for example, applied to surface graft polymerization, and can produce high density polymer brushes that can be used in various applications.

Further, when a compound that does not have electroconductivity is used as a catalyst, a polymer that can be suitably used even in applications where the absence of any residual electroconductive impurities in the polymer is required (for example, resist materials, organic electroluminescence materials and the like), may be obtained.

EXAMPLES

Hereinafter, Preparation Examples and Examples of the present invention will be explained. However, the present invention is not limited by these Examples.

(Compounds Used)

The structures of the main alcohol compounds used are as follows:

Formula 8

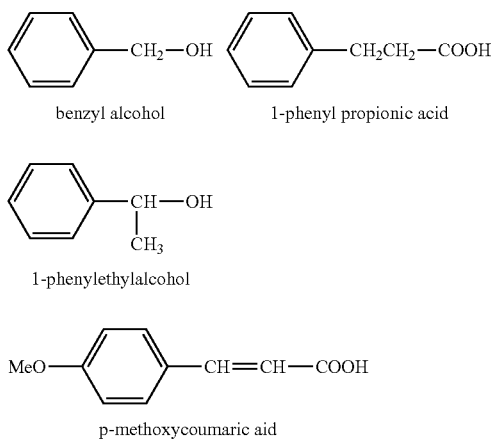

benzyl alcohol      1-phenyl propionic acid 1-phenylethylalcohol p-methoxycoumaric aid -continued

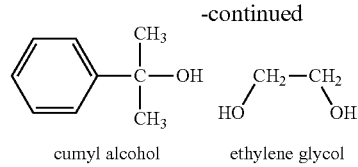

cumyl alcohol      ethylene glycol

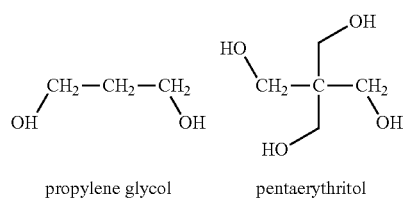

propylene glycol      pentaerythritol

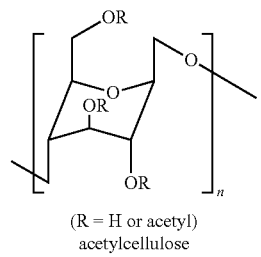

(R = H or acetyl)
acetylcellulose

Preparation Example (Entry 1)

Methyl methacrylate (MMA) (8000 mM (bulk)), benzyl alcohol (80 mM), and NIS (80 mM) were used. These materials were dissolved in 3 g of methyl methacrylate (MMA) to obtain a reaction solution having the aforementioned concentrations. The monomer concentration was about 8 M. The solubilities of these materials were satisfactory, and a homogeneous solution was formed. In order not to promote a polymerization reaction, a radical initiator was not added. The remaining oxygen was replaced with argon, and the reaction solution was heated to 80° C. for 3 hours.

The intermediate, hypoiodite (RO—I) was extremely unstable so that it was impossible to isolate it.

After the reaction, the reaction mixture was fractionated by preparative GPC. The species having the highest molecular weight was RO-$M_m$-I (compound 1) (m=1). In a condition using a stoichiometric amount (one equivalent of NIS with respect to alcohol), the yield was 40%. This was analyzed by $^1$H NMR (FIG. 1). Moreover, element analysis was carried out. The compound RO-$M_m$-I with m>1 was not substantially measured. Since the I. concentration was sufficiently high, it is considered that the reaction of path 1 or path 2 of Scheme 4 below occurred.

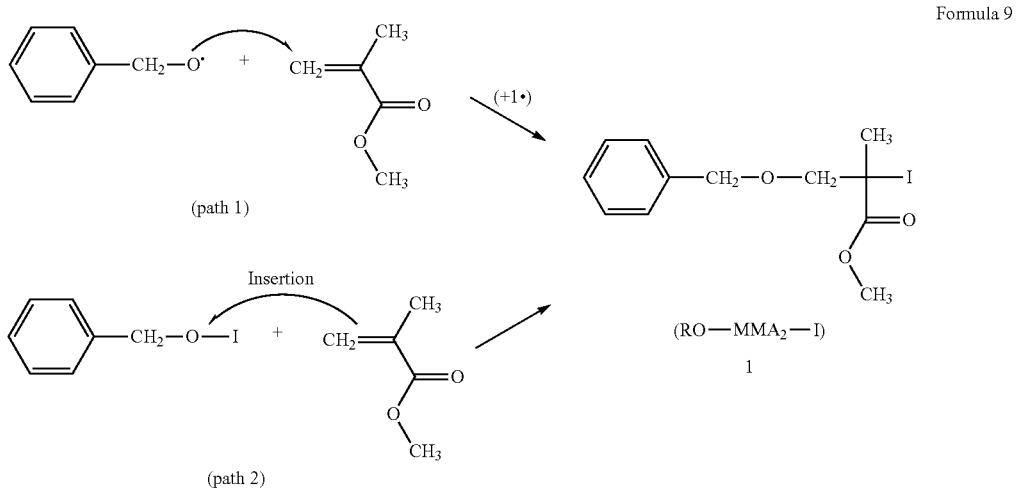

(Scheme 4)

Figure 2:
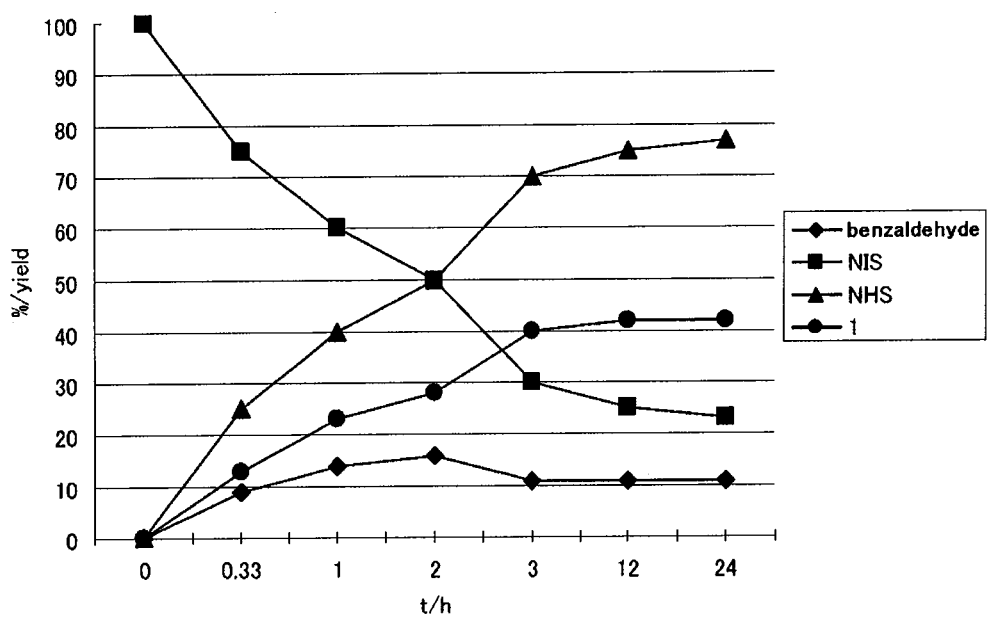
FIG. 2 shows a graph plotting with respect to the time (t) of the concentration of RO—H, RO-$M_1$-I (compound 1), benzaldehyde (compound 3), NIS and NHS(N-hydrated succinimide) for a mixture of MMA (M) (8000 mM, in a bulk), benzyl alcohol (R=benzyl) (240 mM) and NIS (240 mM), 80° C. (Example 1, entry 1).

The results are shown in the following table (Table 1). From the results, it was confirmed that a hypoiodite derived from benzyl alcohol (primary alcohol) can react with a double bond of MMA. FIG. 2 shows changes of the concentrations of the raw material compound and the produced compound after a period of time in this reaction.

(Entries 2 to 3)

Experiments were carried out in the same manner as in the entry 1 except that the amounts of the reaction materials and the reaction conditions were changed as shown in the following table.

The results are shown in the following table. From the results, it was confirmed that a hypoiodite derived from benzyl alcohol (primary alcohol) can react with a double bond of MMA.

(Entry 4)

An experiment was carried out using 1-phenylethyl alcohol instead of benzyl alcohol of Preparation Example 1. As a result, a corresponding compound RO-MMA$_1$-I was obtained. In a condition using a stoichiometric amount (one equivalent of NIS with respect to alcohol), the yield was 29%.

The results are shown in the following table. From the results, it was confirmed that a hypoiodite derived from 1-phenylethyl alcohol (secondary alcohol) can react with a double bond of MMA.

(Entry 5)

An experiment was carried out using cumyl alcohol instead of benzyl alcohol of Preparation Example 1. As a result, a corresponding compound RO-MMA$_1$-I was obtained. In a condition using a stoichiometric amount (one equivalent of NIS with respect to alcohol), the yield was 10%.

The results are shown in the following table. From the results, it was confirmed that a hypoiodite derived from cumyl alcohol (tertiary alcohol) can react with a double bond of MMA. It is noted that in the table, T is a heat temperature and t is a period of time of heating.

TABLE 1

| entry | MMA (mM) | alcohol (mM) | NIS (mM) | T (° C.) | t (h) | yield (%) |
|---|---|---|---|---|---|---|
| 1 | 8000 | benzyl alcohol 240 | 240 | 80 | 3 | 40 |
| 2 | 8000 | benzyl alcohol 240 | 384 | 80 | 3 | 48 |
| 3 | 8000 | benzyl alcohol 240 | 480 | 95 | 2 | 55 |
| 4 | 8000 | 1-phenylethyl alcohol 240 | 240 | 80 | 3 | 29 |
| 5 | 8000 | cumyl alcohol 240 | 240 | 80 | 3 | 10 |

Example 1

Experiments of the following entry 1 to entry 14 were carried out.

(Entry 1)

MMA (8000 mM (bulk)), benzyl alcohol (80 mM), and NIS (80 mM) were used. These materials were dissolved in 3 g of methyl methacrylate (MMA) to obtain a reaction solution having the aforementioned concentrations. The monomer concentration was about 8 M. The solubilities of these materials were satisfactory, and a homogeneous solution was formed. The remaining oxygen was replaced with argon, and the reaction solution was heated to 80° C. for 1 hour. Then AIBN (40 mM) was added, and polymerization reaction was carried out at 80° C. for 3 hours. A series of operations from mixing of MMA, benzyl alcohol and NIS to the completion of the polymerization was carried out continuously in one reaction vessel.

It is noted that regarding concentrations, "mM" refers to the number of millimoles relative to 1 liter of a monomer. For example, 80 mM means that 80 millimoles of a solute is dissolved in 1 liter of a monomer. Regarding concentrations, "M" refers to the number of moles relative to 1 liter of a monomer. For example, 8 M means that 8 moles of a solute is dissolved in 1 liter of a monomer. It is noted that in the case of MMA, 1 liter of a monomer (bulk) is 8 moles at room temperature.

The results are shown in the following table. In the table, $t_1$ (h) is the heating period of time before the addition of AIBN. $t_2$ (h) is the polymerization period of time after the addition of AIBN. $M_n$ is the number average molecular weight of the obtained polymer. PDI shows the $M_w/M_n$ ratio. $M_w$ is the weight average molecular weight. cony is the monomer conversion ratio (polymerization ratio).

As a result of the experiment, it was confirmed that the remaining NIS acts as a catalyst for the living radical polymerization. That is, a polymer having a high molecular weight and a low polydispersity was obtained.

(Entries 2 to 6)

Experiments were carried out in the same manner as in the entry 1 except that the formulations shown in the following table were used. That is, only MMA, benzyl alcohol and NIS were mixed and the mixture was heated at 80° C. for 1 hour. Thereafter, only AIBN was added and polymerization reaction was performed. The results are shown in the following table.

As a result of the experiment mentioned above, it was confirmed that the remaining NIS acts as a catalyst for the living radical polymerization. That is, a polymer having a high molecular weight and a low polydispersity was obtained.

TABLE 2

| | Composition | $t_1$ (h) | $t_2$ (h) | Mn | Conv. | PDI |
|---|---|---|---|---|---|---|
| entry 1 | MMA/benzyl alcohol/NIS/AIBN = 8000/80/80/40 | 1 | 3 | 11800 | 35 | 1.26 |
| entry 2 | MMA/benzyl alcohol/NIS/AIBN = 8000/80/40/40 | 1 | 0.83 | 25000 | 79 | 1.45 |
| entry 3 | MMA/benzyl alcohol/NIS/AIBN = 8000/80/40/20 | 1 | 2.5 | 26000 | 60 | 1.45 |
| entry 4 | MMA/benzyl alcohol/NIS/AIBN = 8000/240/240/120 | 1 | 3 | 6600 | 71 | 1.25 |
| entry 5 | MMA/benzyl alcohol/NIS/AIBN = 8000/240/240/160 | 1 | 1.67 | 6300 | 49 | 1.32 |
| | | 1 | 3 | 4400 | 53 | 1.29 |
| entry 6 | MMA/benzyl alcohol/NIS/AIBN = 8000/240/480/240 | 1 | 1 | 4100 | 57 | 1.27 |

(Entries 7-8)

Experiments were carried out in the same manner as in the entry 1 except that the formulations and heating period of time shown in the following table were used. That is, only MMA, benzyl alcohol and NIS were mixed and the mixture was heated at 80° C. for 3 hours. Thereafter, only AIBN was added and polymerization reaction was performed. The results are shown in the following table.

TABLE 3

| | Composition | $t_1$ (h) | $t_2$ (h) | Mn | Conv. | PDI |
|---|---|---|---|---|---|---|
| entry 7 | MMA/benzyl alcohol/NIS/AIBN = 8000/240/240/120 | 3 | 1.83 | 3100 | 14 | 1.16 |
| | | 3 | 2.16 | 5300 | 39 | 1.17 |
| | | 3 | 2.5 | 7500 | 77 | 1.27 |
| entry 8 | MMA/benzyl alcohol/NIS/AIBN = 8000/80/80/40 | 3 | 1 | 1900 | 7 | 1.32 |
| | | 3 | 1.5 | 8800 | 43 | 1.26 |
| | | 3 | 2.87 | 17000 | 83 | 1.33 |

(Entry 9)

An experiment was carried out in the same manner as in the entry 1 using the formulation and heating period of time shown in the following table. However, MMA, benzyl alcohol, NIS and AIBN were mixed all at one time and were heated at 80° C. The results are shown in the following table.

(Entry 10)

An experiment was carried out in the same manner as in the entry 1 using the formulation and heating period of time shown in the following table. However, MMA, benzyl alcohol, NIS and AIBN were mixed all at one time and were heated at 50° C. for 6 hours. Thereafter, further it was heated at 80° C. for 2.5 hours (Total heating period of time is 8.5 hours). The results are shown in the following table.

TABLE 4

| | Composition | $t_1$ | $t_2$ (h) | Mn | Conv. | PDI |
|---|---|---|---|---|---|---|
| entry 9 | MMA/benzyl alcohol/NIS/AIBN = 8000/80/80/40 | — | 4.5 | 11000 | 46 | 1.40 |
| | | — | 5 | 17000 | 67 | 1.41 |
| entry 10 | MMA/benzyl alcohol/NIS/AIBN = 8000/80/80/40 | — | 8.5 | 21000 | 83 | 1.45 |

(Entry 11)

An experiment was carried out in the same manner as in the entry 1 using the formulation and heating period of time shown in the following table. However, 3 materials, i.e., MMA/benzyl alcohol/PhI(AcO)$_2$ were agitated for 1 hour at room temperature, and then I$_2$, AIBN and NIS were added and polymerization (80° C.) was carried out. The results are shown in the following table. It should be noted that time $t_2$ is the period of time after adding I$_2$, AIBN and NIS.

(Entries 12 to 13)

Experiments were carried out in the same manner as in the entry 1 using the formulation and heating period of time shown in the following table. However, 3 materials, i.e., MMA, 2-phenylpropionic acid/NIS were heated at 80° C. for 3 hours, and thereafter only AIBN was added and polymerization (80° C.) was performed. The results are shown in the following table. Time $t_2$ is the period of time after adding AIBN.

(Entry 14)

An experiment was carried out in the same manner as in the entry 1 using the formulation and heating period of time shown in the following table. However, 3 materials, i.e., MMA, p-methoxycoumaric acid/NIS were heated at 80° C. for 3 hours, and thereafter only AIBN was added and polymerization (80° C.) was performed. The results are shown in the following table. Time $t_2$ is the period of time after adding AIBN.

TABLE 5

| | Composition | $t_1$ (h) | $t_2$ (h) | Mn | Conv. | PDI |
|---|---|---|---|---|---|---|
| entry 11 | MMA/benzyl alcohol/PhI(AcO)$_2$/I$_2$/AIBN/NIS = 8000/240/120/80/120/30 | 1 | 0.5 | 3600 | 83 | 1.49 |
| entry 12 | MMA/2-phenylpropionic acid/NIS/AIBN = 8000/80/80/40 | 3 | 3 | 2900 | 8 | 1.35 |
| | | 3 | 4 | 20000 | 59 | 1.30 |
| entry 13 | MMA/2-phenylpropionic acid/NIS/AIBN = 8000/240/240/120 | 3 | 4.5 | 8800 | 72 | 1.45 |
| entry 14 | MMA/p-methoxycoumaric acid/NIS/AIBN = 8000/240/240/120 | 3 | 3.5 | 14000 | 52 | 1.19 |

Example 2

Graft Polymerization from a Silica Wafer Surface

The method of the present invention can be utilized for Si—O—H present on the silicon surface as an alcohol compound. Therefore, polymerization can be carried out directly from a silicon substrate surface.

(Entries 1 and 2)

A commercially available silicon wafer was cut into a size of about 1 cm×about 1 cm and thickness of about 0.5 mm to give a silicon substrate sample. The silicon substrate was left in the air at room temperature for about 24 hours or more to allow the silicon atoms on the surface to contacting sufficiently with water in the air. One sample of the silicon substrate, MMA (8000 mM) and NIS (2 mM or 10 mM) were used for the experiments. NIS was dissolved in 3 g of methyl methacrylate (MMA) to obtain a reaction solution having the aforementioned concentration. The monomer concentration was about 8M. The solubility of these materials was satisfactory, and a homogeneous solution was formed. The silicon substrate sample was immersed in the obtained solution, the remaining oxygen was replaced with argon, and the sample was heated at 80° C. for 1 hour. Thereafter, only AIBN was added, and polymerization (80° C.) was carried out (Table 6 (time $t_1$ is the heating period of time before addition of AIBN, and time $t_2$ is the heating period of time after addition of AIBN)). After completion of the reaction, the silicon substrate was taken out from the solution, washed well with toluene and methanol, and the film thickness of the grafted polymethyl methacrylate (PMMA) on the surface was measured. As shown in Table 6 (entries 1 and 2), a PMMA film of about 5 nm thickness was produced, and polymerization from the silicon substrate was observed.

(Entry 3)

Next, polymerization was attempted wherein CP—I (2-cyanopropyl iodide) was added together as a free initiator (an initiator (alkyl iodide) which is not fixed on the substrate) at the time of adding AIBN in the system of the entry 2 (entry 3). Among the obtained polymers, the number average molecular weight of the free polymers (polymers which are not bound to the substrate) was analyzed. The results are shown in the following table. Since $M_n$ of the free polymer and $M_n$ of the graft polymer are theoretically considered as being the same, from the substrate area, graft film thickness and Mn, the graft density was calculated to be 0.06 chains/nm².

Example 3

Graft Polymerization from the Cellulose Nanofiber Surface

A sulfuric acid treatment was applied to ascidian to obtain a cellulose nanofiber (15 nm×20 nm×several μm). Thereafter, the solvent was replaced with N,N-dimethyl acetamide. To 1 g of the nanofiber dispersion (nanofiber content: about 0.3 wt %), 0.6 g of polyethylene glycol methyl ether methacrylate (PEGMA (molecular weight=475)) or MMA, and 0.036 g (100 mM) of N-iodosuccinimide (NIS) were added and agitated at room temperature for 4 hours. Thereafter, only AIBN (80 mM), or AIBN (80 mM) and CP—I (free initiator) (80 mM) were added and polymerized at 80° C. for 4 hours.

The nanofiber before adding AIBN was washed with toluene and ethanol and analyzed by the infrared absorption spectroscopy (IR). Both in the case of using PEGMA as the monomer and in the case of using MMA as the monomer, infrared absorption (in the vicinity of 1720 cm⁻¹) derived from the carbonyl group of the monomer was detected and introduction of a polymerization starting group was confirmed. From the infrared absorption intensity and the surface area of the nanofiber, the surface densities of the polymerization starting group in the case of using PEGMA and in the case of using MMA were 0.14 and 0.11 sites/nm², respectively. Absorption derived from the carbonyl group was further increased in the nanofiber after the polymerization and polymerization from the polymerization starting group was observed.

Example 4

MMA (8000 mM (bulk)), benzyl alcohol (80 mM), and NIS (80 mM) were used. 3 g of these materials were prepared and the remaining oxygen was replaced with argon. The

TABLE 6

SURFACE STARTING POLYMERIZATION OF MMA ON THE SILICON WAFER SURFACE (80° C.)

| Entry | [MMA]₀:[CP-I]₀:[NIS]:[AIBN] | $t_1$ (h) | $t_2$ (h) | Conv. (%) | $M_n$ | $M_{n,theo}$ | PDI | graft film thickness (nm) | graft density (chains/nm²) |
|---|---|---|---|---|---|---|---|---|---|
| 1 | 8000:0:2:10 | 1 | 4 | | | | | 5.2 | |
| 2 | 8000:0:10:10 | 1 | 4 | | | | | 4.8 | |
| 3 | 8000:80:10:10 | 1 | 4 | 70 | 9940 | 7000 | 1.48 | 0.9 | 0.06 |

It is noted that Mn is a number average molecular weight. $M_{n,theo}$ denotes a theoretical value calculated according to the following formula:

$$M_{n,theo} = ([M]_0/[R\text{—}I]_0) \times (\text{molecular weight of the monomer}) \times (\text{conv})/100 \quad \text{Numerical formula 1}$$

wherein $[M]_0$ and $[R\text{—}I]_0$ are the initial concentrations (charge concentration) of a monomer and an alkyl iodide that is to be used as a dormant species, respectively; and conv is the monomer conversion ratio (polymerization ratio).

reaction solution was heated at 80° C. for 3 hours. Thereafter, TBA (40 mM), or TDME (40 mM or 120 mM) and iodine (10 mM or 40 mM) were added. Polymerization was carried out at 80° C. for the period of time shown in the following table. It should be noted that a radical initiator was not added. Examples 1-3 are RTCP, and Example 4 is redox polymerization using an organic compound as a catalyst. All the reaction operations were carried out in one reaction vessel continuously. The results are shown in the following table. It is noted that t (min) is the polymerization period of time after addition of TDME and iodine.

Table 7A

| entry | monomer | R-X | I | XA | [M]/[R-X]0/[I]0/[XA]0(mM) |
|---|---|---|---|---|---|
| 1 | MMA | BzOH | | TBA/NIS | 8000/80/0/40/80 |
| 2 | MMA | BzOH | | TDME/NIS/I$_2$ | 8000/80/0/40/80/10 |
| 3 | MMA | BzOH | | TDME/NIS/I$_2$ | 8000/80/0/120/80/40 |

Table 7B

| entry | T (° C.) | t (min) | conv (%) | Mn | Mn, theo | PDI |
|---|---|---|---|---|---|---|
| 1 | 80 | 300 | 6.3 | 3700 | 630 | 1.33 |
| 2 | 80 | 300 | 10.7 | 7100 | 1100 | 1.36 |
| 3 | 80 | 180 | 65 | 7800 | 6500 | 1.35 |

MMA: methyl methacrylate (8M(bulk))
BzOH: benzyl alcohol
TDME: 1,4,8,11-tetramethyl-1,4,8,11-tetraazacyclotetradecane
TBA: tributylamine
NIS: N-iodosuccinimide Example 5

Benzyl methacrylate (BzMA) (8000 mM (bulk)), benzyl alcohol (80 mM), and NIS (80 mM) were used. 3 g of these materials were prepared and the remaining oxygen was replaced with argon. The reaction solution was heated at 80° C. for 3 hours. Thereafter, AIBN (40 mM) was added, and polymerization was performed at 80° C. for the period of time shown in the following table. All the reaction operations were carried out in one reaction vessel continuously. The results are shown in the following table. It should be noted that t (min) is the polymerization period of time after addition of AIBN.

Table 8A

| entry | monomer | R-X | I | XA | [M]/[R-X]0/[I]0/[XA]0(mM) |
|---|---|---|---|---|---|
| 1 | BzMA | BzOH | AIBN | NIS | 8000/80/40/80 |

Table 8B

| entry | T (° C.) | t (min) | conv (%) | Mn | Mn, theo | PDI |
|---|---|---|---|---|---|---|
| 1 | 80 | 180 | 90 | 24000 | 15840 | 1.23 |

BzMA: benzyl methacrylate (8M(bulk))
BzOH: benzyl alcohol
AIBN: azobis(isobutyronitrile)
NIS: N-iodosuccinimide Example 6

Styrene (St) (8000 mM (bulk)), benzyl alcohol (80 mM), and NIS (80 mM) were used. 3 g of these materials were prepared and the remaining oxygen was replaced with argon. The reaction solution was heated at 80° C. for 3 hours. Thereafter, AIBN (80 mM) was added. Polymerization was performed at 80° C. for the period of time shown in the following table. All the reaction operations were carried out in one reaction vessel continuously. The results are shown in the following table. It is noted that t (min) is the polymerization period of time after addition of AIBN.

Table 9A

| entry | monomer | R-X | I | XA | [M]/[R-X]0/[I]0/[XA]0(mM) |
|---|---|---|---|---|---|
| 1 | St | BzOH | AIBN | NIS | 8000/80/80/80 |

Table 9B

| entry | T (° C.) | t (min) | conv (%) | Mn | Mn, theo | PDI |
|---|---|---|---|---|---|---|
| 1 | 80 | 180 | 75.4 | 5200 | 7800 | 1.49 |

St: styrene (8M(bulk))
BzOH: benzyl alcohol
AIBN: azobisisobutyronitrile
NIS: N-iodosuccinimide Example 7

Acrylonitrile (AN) (8000 mM (bulk)), benzyl alcohol (80 mM), and NIS (80 mM) were used. 3 g of these materials were prepared and the remaining oxygen was replaced with argon. The reaction solution was heated at 80° C. for 3 hours. Thereafter, AIBN (80 mM) was added. Polymerization was performed at 70° C. for the period of time shown in the following table. All the reaction operations were carried out in one reaction vessel continuously. The results are shown in the following table. It should be noted that t (min) is the polymerization period of time after addition of AIBN.

Table 10A

| entry | monomer | R-X | I | XA | [M]/[R-X]0/[I]0/[XA]0(mM) |
|---|---|---|---|---|---|
| 1 | AN | BzOH | AIBN | NIS | 8000/80/80/80 |

Table 10B

| entry | T (° C.) | t (min) | conv (%) | Mn | Mn, theo | PDI |
|---|---|---|---|---|---|---|
| 1 | 70 | 160 | 20 | 2000 | 1100 | 1.22 |

AN: acrylonitrile (8M(bulk))
BzOH: benzyl alcohol
AIBN: azobisisobutyronitrile
NIS: N-iodosuccinimide Example 8

MMA (8000 mM (bulk)), alcohol (80 mM based on the hydroxyl group mole concentration), and NIS (80 mM) were used. 3 g of these materials were prepared and the remaining oxygen was replaced with argon. The reaction solution was heated at 80° C. for 3 hours. Thereafter, AIBN (60 mM) was added, and polymerization was carried out at 80° C. for the period of time shown in the following table. From ethylene glycol and propylene glycol having two hydroxyl groups, a polymer with chains elongating in both directions from the two hydroxyl groups was produced, and from pentaerythritol having four hydroxyl groups, a four-chain (star type) polymer having chains extending from the four hydroxyl groups was produced. In each of the cases, all the reaction operations were carried out in one reaction vessel continuously. The results are shown in the following table. It should be noted that t (min) is the polymerization period of time after addition of AIBN. It should be noted that Mn and PDI were obtained by gel permeation chromatography (GPC) with tetrahydrofuran (THF) as an eluent calibrated by straight chain poly(methyl methacrylate) (PMMA) standard.

Table 11A

| entry | monomer | R-X | I | XA | [M]/[R-X]0/[I]0/[XA]0(mM) |
|---|---|---|---|---|---|
| 1 | MMA | ethylene glycol | AIBN | NIS | 8000/80/60/80 |
| 2 | MMA | propylene glycol | AIBN | NIS | 8000/80/60/80 |
| 3 | MMA | penta erythritol | AIBN | NIS | 8000/80/60/80 |

Table 11B

| entry | T (° C.) | t (min) | conv (%) | Mn | Mn, theo | PDI |
|---|---|---|---|---|---|---|
| 1 | 80 | 180 | 43.5 | 7500 | 4300 | 1.40 |
|   |    | 240 | 79.9 | 13000 | 8000 | 1.49 |
| 2 | 80 | 240 | 17.9 | 3200 | 1800 | 1.32 |
| 3 | 80 | 180 | 23.0 | 7800 | 2300 | 1.28 |
|   |    | 300 | 78.6 | 18000 | 7900 | 1.39 |

MMA: methyl methacrylate (8M(bulk))
AIBN: azobisisobutyronitrile
NIS: N-iodosuccinimide Example 9

MMA (8000 mM (bulk)), acetyl cellulose (80 mM based on the hydroxyl group mole concentration), and NIS (80 mM) were used. 3 g of these materials were prepared and the remaining oxygen was replaced with argon. The reaction solution was heated at 80° C. for 3 hours. Thereafter, AIBN (60 mM) was added, and polymerization was carried out at 80° C. for the period of time shown in the following table. As the acetyl cellulose, one having Mn of 50,000, with 0.5 hydroxyl group per 1 glucose unit (acetyl substitution degree (DS)=2.5) was used. By the polymerization, a comb-type polymer having acetyl cellulose as the stem chain and poly(methyl methacrylate) (PMMA) as the branch chain was produced. It should be noted that t (min) is the polymerization period of time after addition of AIBN. It should be noted that Mn and PDI were obtained by gel permeation chromatography (GPC) with tetrahydrofuran (THF) as an eluent calibrated by straight chain poly(methyl methacrylate) (PMMA) standard.

Table 12A

| entry | monomer | R-X | I | XA | [M]/[R-X]0/[I]0/[XA]0(mM) |
|---|---|---|---|---|---|
| 1 | MMA | acetyl cellulose | AIBN | NIS | 8000/80/60/80 |

Table 12B

| entry | T (° C.) | t (min) | conv (%) | Mn | Mn, theo | PDI |
|---|---|---|---|---|---|---|
| 1 | 80 | 120 | 22 | 72000 | 270000 | 1.37 |

MMA: methyl methacrylate (8M(bulk))
AIBN: azobisisobutyronitrile
NIS: N-iodosuccinimide As described above, the present invention has been illustrated using the preferred embodiments of the present invention. However, the present invention should not be construed to be limited to these embodiments. It is understood that the scope of the present invention should be construed solely on the basis of the claims. It is understood that those skilled in the art can carry out an invention within the scope equivalent to the description of the specification, based on the description of the specific preferred embodiments, the description of the present invention and the common technical knowledge. It is understood that the patents, patent applications, and other documents cited in the present specification should be incorporated by reference in the present specification as if the contents thereof are specifically described herein.

Industrial Applicability

As described above, the present inventors have invented a living radical polymerization method (precision control radical polymerization) of a novel initiator system utilizing an alcohol compound or an amine compound and a halogenating agent for production of a starting dormant species. According to the novel polymerization method, various compounds may be used as starting groups, and the various compounds can easily be introduced into a terminal of a living radical polymerization polymer.

One half or more of the amount of polymer compounds produced in the world is produced by radical polymerizations. A living radical polymerization method can be applied to the production of a variety of high value added material. Specifically, it can be used for production of, for example, thermoplastic elastomer (material for automobiles, industrial articles, medical materials, footwear, sports articles, toys, materials for coating electrical wire, materials for buildings or construction, materials for modifying resins, and the like), materials for resistor, materials for organic electroluminescence device), adhesives, polymer alloy, various filler additives, lubricant, surfactant, paint, ink, packaging material, pharmaceuticals (for example, materials for sustained release medicaments), personal care products (cosmetics, hairdressings, and the like), and the like. The scale of the market is very large. The living radical polymerization of the present invention can be widely used as a satisfactory process for producing new electronic materials, optical materials, separation materials, or materials for a living body.

The invention claimed is:

1. A living radical polymerization method, comprising:
   a step of halogenating an alcohol compound, wherein the atom bound to the hydroxyl group in the alcohol compound is carbon, with a halogenating agent capable of halogenating hydrogen of a hydroxyl group of an alcohol to produce a halogenated derivative compound wherein the hydrogen in the hydroxyl group is substituted with a halogen, wherein the atom bound to the hydroxyl group of the alcohol compound has a non-conjugated structure, and
   a step of conducting living radical polymerization of a monomer having a radical-reactive unsaturated bond using the halogenated derivative compound as a dormant species for the living radical polymerization, wherein a radical produced by elimination of a halogen from the halogenated derivative compound is allowed to react with the unsaturated bond of the monomer, wherein the halogenating agent has a structure of the following formula 4, $$R^2-C(=O)-NX-C(=O)-R^3, \quad \text{Formula 4}$$

wherein X is a halogen,
$R^2$ and $R^3$ are each independently an arbitrary substituent,
$R^2$ and $R^3$ may be linked with each other to form a ring structure, and
the halogenating agent acts also as a catalyst for living radical polymerization.

2. The method according to claim 1, wherein the atom bound to the hydroxyl group in the alcohol compound is carbon having a $Sp^3$ hybrid orbital.

3. The method according to claim 1, wherein the halogenating agent is an iodizing agent capable of iodizing an alcohol, or a brominating agent capable of brominating an alcohol.

4. The method according to claim 1, wherein in the halogenating agent, $R^2$ and $R^3$ are linked with each other to be an alkylene or a substituted alkylene such that the structure of the formula 4 is a ring structure,
the alkylene has 1 to 10 carbon atoms,
the alkylene in the substituted alkylene has 1 to 10 carbon atoms, and
the substituent in the substituted alkylene is selected from a halogen and a hydroxyl group.

5. The method according to claim 4, wherein the structure of the formula 4 is a 5-membered ring structure or a 6-membered ring structure, and X is iodine.

6. The method according to claim 1, wherein the halogenating agent is N-iodosuccinimide.

7. The method according to claim 1, wherein the alcohol compound is solid.

8. The method according to claim 1, wherein the halogenating agent is a mixture of diacetoxy iodobenzene ((AcO)$_2$IPh) and I$_2$.

9. A polymer having a residue of a polyol compound bound to a terminal of a polymer chain obtained by the radical polymerization of claim 1 of a monomer having a reactive unsaturated bond,
wherein an oxygen atom derived from the hydroxyl group of the polyol compound is directly bound to any one of two carbon atoms which had composed a reactive unsaturated bond in the monomer residue of the terminal of the polymer chain.

10. A substrate, to which terminals of polymer chains are bound, wherein the polymer chains are obtained by the radical polymerization of claim 1 of a monomer having a reactive unsaturated bond,
wherein an oxygen atom of the substrate surface is directly bound to any one of two carbon atoms in the monomer residue of the terminal of the polymer chain wherein the two carbon atoms had composed a reactive unsaturated bond.

* * * * *